US008130674B2

(12) United States Patent
Plotnik et al.

(10) Patent No.: US 8,130,674 B2
(45) Date of Patent: Mar. 6, 2012

(54) DISCOVERY AND REDISCOVERY PROTOCOL METHOD AND SYSTEM

(75) Inventors: Sidney Plotnik, Mississauga (CA); Igor Peonte, Toronto (CA); Vesna Anusic, Mississauga (CA); Mandeep Dhillon, Brampton (CA)

(73) Assignee: Ruggedcom Inc. (CA)

( * ) Notice: Subject to any disclaimer, the term of this patent is extended or adjusted under 35 U.S.C. 154(b) by 260 days.

(21) Appl. No.: 12/507,543

(22) Filed: Jul. 22, 2009

(65) Prior Publication Data

US 2010/0315972 A1 Dec. 16, 2010

(30) Foreign Application Priority Data

Jun. 16, 2009 (CA) ..................................... 2669193

(51) Int. Cl.
*H04L 12/28* (2006.01)

(52) U.S. Cl. ......... 370/254; 370/255; 709/201; 709/202

(58) Field of Classification Search ........................ None
See application file for complete search history.

(56) References Cited

U.S. PATENT DOCUMENTS

| | | | | |
|---|---|---|---|---|
| 5,185,860 | A | 2/1993 | Wu | |
| 5,968,116 | A | 10/1999 | Day, II et al. | |
| 6,052,727 | A | 4/2000 | Kamalanathan | |
| 7,342,925 | B2 * | 3/2008 | Cherchali et al. | 370/389 |
| 7,433,942 | B2 | 10/2008 | Butt et al. | |
| 2004/0081140 | A1 | 4/2004 | Martin | |
| 2004/0255029 | A1 * | 12/2004 | Manion et al. | 709/227 |
| 2006/0245403 | A1 | 11/2006 | Kumar | |
| 2007/0115962 | A1 * | 5/2007 | Mammoliti et al. | 370/389 |
| 2008/0092211 | A1 | 4/2008 | Klemets et al. | |
| 2010/0315972 | A1 * | 12/2010 | Plotnik et al. | 370/254 |

FOREIGN PATENT DOCUMENTS

WO 2006115862 11/2006

OTHER PUBLICATIONS

International Search Report dated Nov. 10, 2010 issued in corresponding European Application No. 10166112.2.
UPnP Forum, UPnP Device Architecture 1.1, Oct. 15, 2008, pp. 1-29, XP-002562314.

* cited by examiner

*Primary Examiner* — Robert Wilson
(74) *Attorney, Agent, or Firm* — Onello & Mello, LLP

(57) ABSTRACT

A management station discovers agent devices connected to a network by broadcasting discovery messages having a session number and waiting for discovery acknowledge unicast messages from at least some of the discovery aware agent devices connected to the network. The management station receives the discovery acknowledge unicast messages from the agent devices and each message comprises the session number and an address uniquely identifying the agent device sending the discovery acknowledge unicast message. The management station then sends a unicast registration message having a sequence number based on the session number of the discovery message. At that point, the agent device will be registered permitting further communication to the registered discovery aware agent device. The management station will send, periodically, rediscovery messages having the same session number as the discovery message. The discovery aware agent devices connected to the network which have not previously responded to a discovery or rediscovery message having the same session number or have not received a registration message with a sequence number related to the session number will respond to subsequent rediscovery messages. The agent devices will not respond to subsequent rediscovery messages if the agent device has previously received a unicast registration message with a sequence number related to the session number of the multicast discovery message or the subsequent multicast rediscovery message.

21 Claims, 19 Drawing Sheets

DISCOVERY AND REDISCOVERY PROTOCOL METHOD AND SYSTEM

CROSS-REFERENCE TO RELATED PATENT APPLICATION

This application claims priority to Canadian Patent Application No. 2,669,193, filed on Jun. 16, 2009, in the Canadian Intellectual Property Office, the disclosure of which is incorporated herein in its entirety by reference.

FIELD OF THE INVENTION

This invention relates to network management. More particularly, the present invention relates to a discovery protocol for discovering agent devices connected to a network.

BACKGROUND OF THE INVENTION

Networks generally have devices connected thereto with agents executable on each network device to facilitate communication of the network device to and from the network. However, before an agent device can communicate with other agent devices connected to the network, the agent device must be configured and the other agent devices, as well as the management station, must be aware of the address of the existing agent devices and any new agent devices connected to the network.

Generally, devices have layer 2 Media Access Control (MAC) addresses preallocated at the time of manufacture. The layer 2 Media Access Control (MAC) address uniquely identifies each agent device manufactured. Generally, the MAC addresses are allocated by the IEEE Standards Association. These MAC numbers are unique hardware numbers for each network device connected to a network and uniquely identify each IED in the network. In an Ethernet local area network the MAC numbers are the same as the Ethernet address.

Typically, network devices are shipped from a manufacturer with default configuration settings, or, no configuration settings at all. This means that a network administrator must access the agent device before deployment in the network to at least minimally configure the network device. This minimal configuration may include providing Internet Protocol (IP) parameters so that IP enabled management tools can then be used to complete the configuration process. This minimal configuration process also requires obtaining the MAC address for each of the agent devices. This initial configuration process generally requires direct access to the network agent device. Unfortunately, in large networks, particularly networks implemented in harsh environments, direct physical access to a network agent device may be problematic, for a number of reasons, including physical barriers to obtaining access and/or the network agent device may be connected to the network at a remote or harsh location to access.

While all Ethernet network agent devices are given a universally unique Media Access Control (MAC) address or other unique identifier in the factory, it can be difficult to obtain the MAC address or other unique identifier from each of the network agent devices. Once the MAC number is obtained, however, the MAC address will facilitate communication with the device irrespective of any other configuration on the device.

Difficulties arise in network management when network agent devices are connected to the network without prior notification to the management station or the network administrator. Furthermore, it is not uncommon, particularly in harsh environments, to have electromagnetic interference and/or other types of interference which affect electrical devices, such that a multicast discovery message may not be received by a particular network agent device in a network. It is also not uncommon in harsh environments that a discovery acknowledge message from a network agent device having received a multicast discovery message does not reach the management station. These and other scenarios require a network management method and system which can robustly discover agent devices connected to a network.

Accordingly, there is a need in the art for a method, system and article of manufacture, comprising a machine-readable medium storing machine, executable instructions which permits an initial discovery and configuration of all discovery aware agent devices connected to a network to obtain at least the MAC address or other unique identifier without requiring physical access to the network agent devices. There is also a need in the art for a method, system and article of manufacture, which can be automated to run periodically in order to ensure that various network agent devices which have not been previously discovered, for whatever reason, are discovered in the future. There is also a need in the art for a method, system and article of manufacture to permit discovery of newly added devices without affecting greatly devices that have already been discovered.

SUMMARY OF THE INVENTION

Accordingly, it is an object of this invention to at least partially overcome some of the disadvantages of the prior art. Also, it is an object of this invention to provide an improved type of method and system which provides for more robust discovery and continued discovery of network agent devices connected to a network.

Accordingly, in one of its aspects, this invention resides in a method for discovering agent devices connected to a network. The method comprises broadcasting, from a management station, a multicast discovery message to all agent devices connected to the network, the multicast discovery message comprising a station address uniquely identifying the management station, a session number identifying a session, and command instructions instructing all discovery aware agent devices connected to the network to answer the discovery message. The method further comprises receiving, at the management station, discovery acknowledge unicast messages from at least some of the discovery aware agent devices connected to the network, the discovery acknowledge unicast messages comprising at least a device address uniquely identifying the discovery aware agent device sending the discovery acknowledge unicast message and the session number identifying the session. And the method comprises sending, from the management station, a unicast registration message to each discovery aware agent device from which the management station received a corresponding discovery acknowledge unicast message using the device address provided in the corresponding discovery acknowledge unicast message, said unicast registration message comprising a sequence number based on the session number identifying the session.

In a further aspect, the present invention resides in a system that facilitates discovery of agent devices connected to a network. The system comprises at least two discovery aware agent devices connected to the network, each discovery aware agent device configured to receive multicast discovery messages and unicast registration signals from the network and to send to the network discovery acknowledge unicast messages comprising a device address uniquely identifying the discovery aware agent device that sent the unicast discovery acknowledge message. Further included is a management station connected to the network and configured to send unicast registration messages, multicast discovery messages and multicast rediscovery messages, said multicast discovery messages and multicast rediscovery messages comprising a station address uniquely identifying the management station and a session number uniquely identifying a session. The management station is configured to broadcast the multicast discovery message on the network and to receive in response discovery acknowledge unicast messages comprising at least the device address uniquely identifying the discovery aware agent device sending the discovery acknowledge unicast message and the session number uniquely identifying the session. And the management station is also configured to send the unicast registration message to each discovery aware agent device from which the management station received a corresponding discovery acknowledge unicast message using the device address provided in the corresponding discovery acknowledge unicast message, said registration message comprising a sequence number based on the session number uniquely identifying the session.

In a further aspect, the present invention resides in an article. The article comprises a non-transitory computer readable medium having stored thereon computer readable code executable by one or more processors to perform a method of discovering agent devices connected to a network. The method comprises a management station, at the commencement of a session, broadcasting a multicast discovery message to all agent devices connected to the network, the multicast discovery message comprising a station address uniquely identifying the management station, a session number identifying the session, and command instructions to all discovery aware agent devices connected to the network to answer the discovery message. The method further includes the management station receiving discovery acknowledge unicast messages from at least some of the discovery aware agent devices connected to the network, the discovery acknowledge unicast messages comprising at least a device address uniquely identifying the discovery aware agent device sending the discovery acknowledge unicast message and the session number identifying the session. And the method includes the management station sending a unicast registration message to each discovery aware agent device from which the management station received a corresponding discovery acknowledge unicast message using the device address provided in the corresponding discovery acknowledge unicast message, said unicast registration message comprising a sequence number based on the session number identifying the session.

Accordingly, one advantage of at least one aspect of the present invention is that a registration message is sent from the management station to each agent device that sends a discovery or rediscovery acknowledge message. In this way, the agent device is aware that the management station has discovered it and has registered its unique agent address to permit further communication. Until the agent device receives the registration message, the registration procedure has not been completed for that particular agent device and the agent device will respond to rediscovery messages having the same session number as the discovery message or subsequent rediscovery messages. In this way, a more robust discovery method and system is provided by ensuring that the agent device will respond to subsequent rediscovery messages until the agent device receives a registration message.

Accordingly, in a further aspect of the present invention, the present invention provides a more robust discovery process which can continue to discover network devices connected to the network which may have been missed during the initial broadcast of the multicast discovery message. This is done, in one embodiment, by sending rediscovery messages periodically after an initial discovery message. To avoid the previously discovered agent devices continuously responding to the rediscovery messages, the rediscovery messages contain a session number which, if it was the same as the session number the discovered agent devices have already received, they will not respond to the subsequent rediscovery messages. In this way, should the agent device not have received the multicast discovery message, or, should the management station not have received the unicast discovery acknowledge message, or, should any one of the agent devices not have received the unicast registration message, they will eventually be discovered using the periodically sent rediscovery messages. This robust discovery method is particularly well suited for harsh environments where electromagnetic interference and other types of mechanical or electrical interference could affect regular transmission such as broadcast discovery messages and broadcast acknowledge messages. Accordingly, one advantage of the present invention is that the robust discovery method is better suited for harsh environments because it should eventually discover all of the discovery aware agent devices connected to the network.

A further advantage of the present invention is that the session number can be used as a basis for the current session and all of the discovered agent devices will be aware of the sequence number during the session. In this way, if, for whatever reason, the management station wishes to commence a new session and discover all of the elements anew, it can do so by changing the session number and then sending a new discovery message and compel all of the discovery aware agent devices to retransmit discovery acknowledge signals based on the new session number identifying the new session. It is understood that, in this case, any rediscovery signals will then be repeated with the new session number. It is also understood that this procedure can be repeated indefinitely for any new session numbers.

A further advantage of at least one aspect of the present invention is that the rediscovery signal which contains the session number of the previous discovery signal will only cause the discovery aware agent devices that have not received the registration signal to respond. In this way, a relatively small subset of the overall network devices connected to the network will respond to a rediscovery message. This decreases the traffic or potential traffic on the network after the initial discovery messages have discovered and registered most of the discovery aware agent devices connected to the network. In this way, the overall traffic on the network, as well as the load on the individual agent devices that have already been registered, is greatly decreased. This is also the case with respect to the management station which would only need to listen for and respond to rediscovery acknowledge unicast messages from a small set of the discovery aware agent devices, or, perhaps none, that have not previously received a unicast registration message. It will be apparent that in most cases the management station will only receive rediscovery acknowledge unicast messages from discovery aware agent devices that have been recently added to the network since the last discovery or rediscovery multicast message. In this way, the overall administrative load on the network and the management station is less.

A further advantage of the present invention is that if a large number of devices are connected to the network, they may all simultaneously send the discovery acknowledge unicast message substantially simultaneously which could prevent all of the discovery aware agent devices from being registered in response to an initial discovery message. However, by having subsequent rediscovery messages sent with the same session number, the number of discovery aware agent devices that will send a rediscovery acknowledge unicast message will likely be less and, therefore, the chances that the management station will not receive a particular rediscovery acknowledge unicast message because it was sent simultaneously, or substantially simultaneously, from different discovery aware agent devices is lessened. Nevertheless, even if the management station does not receive a rediscovery acknowledge unicast message from a particular discovery aware agent device because it was sent simultaneously, or substantially simultaneously with another rediscovery acknowledge unicast message, that particular discovery aware agent devices can still be discovered by a subsequent rediscovery messages.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1A:
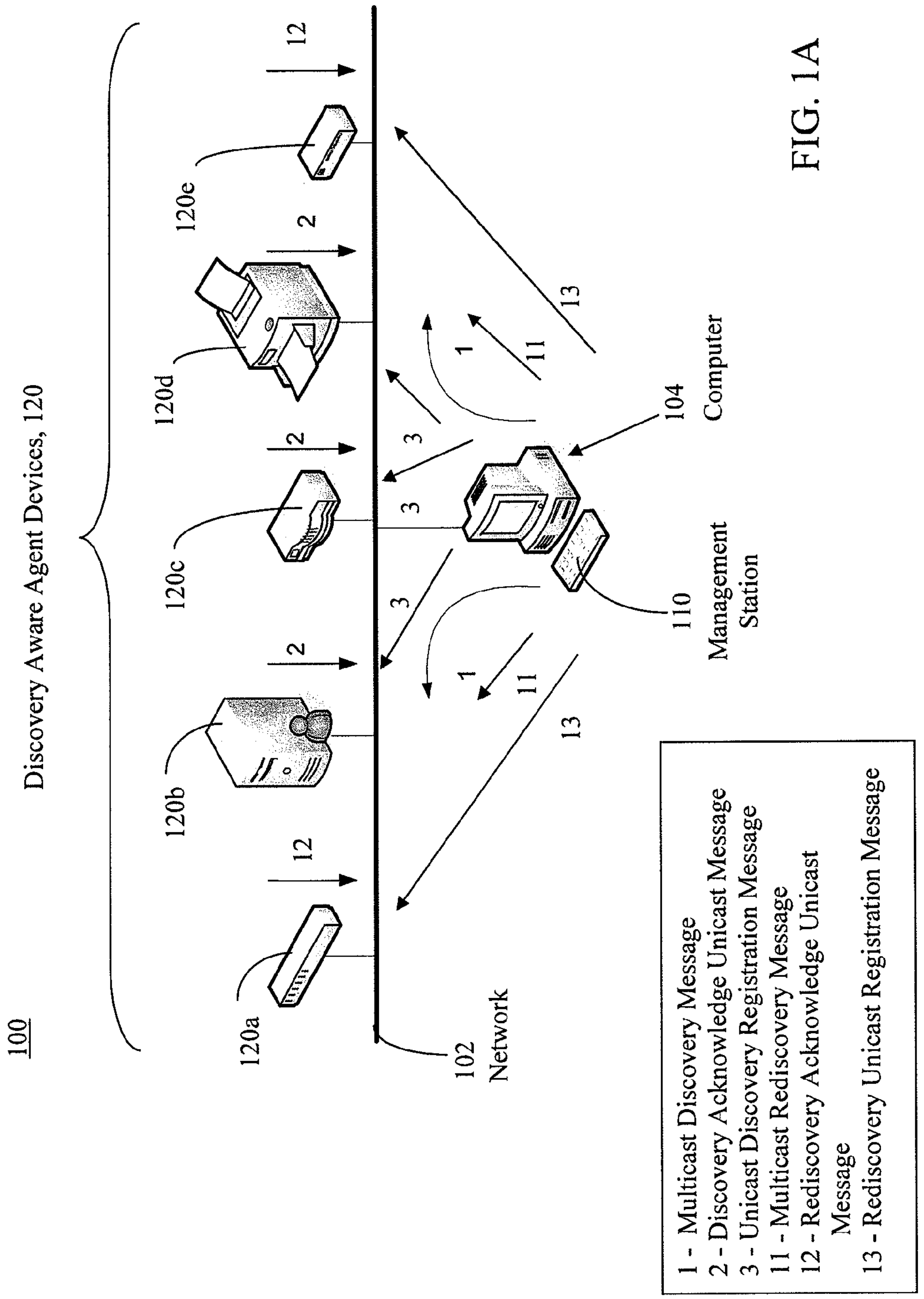
FIG. 1A illustrates a typical network with a Management Station and several Discovery Protocol aware devices according to one embodiment of the present invention.
Figure 1B:
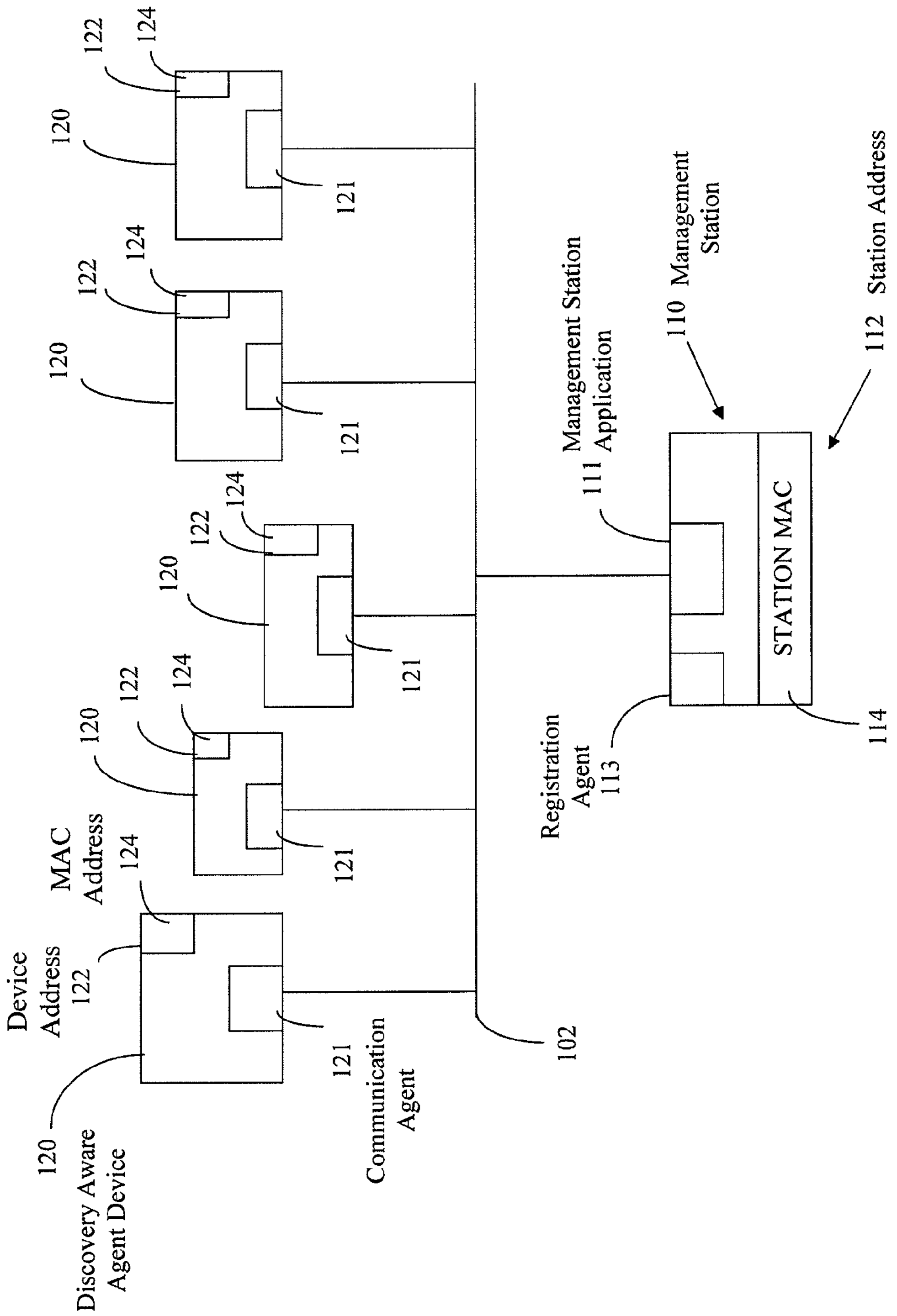
FIG. 1B is a schematic illustration of the Ethernet network shown in FIG. 1A.

As shown in FIGS. 1A and 1B, one embodiment of the present invention relates to the system, shown generally by reference numeral 100, having a network 102 for facilitating communication between a management station, shown generally by reference numeral 110, and various discovery aware agent devices, shown generally by reference numeral 120. As illustrated in FIG. 1A, the discovery aware agent devices 120 can be any type of network device. In a preferred embodiment, the discovery aware agent devices 120 are intelligent electronic devices. More preferably, the discovery aware agent devices 120 comprise Ethernet devices which can communicate on the network 102 using Ethernet protocol.

As illustrated in FIG. 1B, the agent devices 120 comprise, preferably, communication agents 121 which facilitate communication of the devices 120 to and from the network 102. In the preferred embodiment, where the agent devices 120 comprise Intelligent Electronic Devices for communicating on a network 102 using Ethernet protocol, the communication agents 121 have an Ethernet interface. The devices 120 also comprise a unique device address 122 which uniquely identifies the device 120. The unique device address 122 is preferably installed at the time of manufacture. In a preferred embodiment, the unique device address 122 is a media access control (MAC) address 124 allocated by the IEEE Standards Association and set at the time of manufacture.

The management station 110 preferably comprises a computer 104 which performs a number of management and monitoring functions on the network 102. The management station 110 preferably comprises a management station application 111 executable by the management station 110 to perform the management and monitoring functions.

In one aspect of the present invention, the management unit 110 also performs the initial discovery process. The initial discovery process involves "discovering" each of the discovery aware agent devices 120 connected to the network 102. In one aspect, this involves obtaining the device address 122 of the agent devices 120 to permit subsequent communication to and from the management station 110 and the agent devices 120. The management station 110 further comprises a unique station address, shown generally by reference numeral 112 in FIG. 1B, uniquely identifying the management station 110 in the network 102. In a preferred embodiment, the station address 112 is a station media access control (MAC) address 114.

In one embodiment of the present invention, the management station 110 will discover the various agent devices 120 connected to the network 102 by initially broadcasting a multicast discovery message, shown generally by reference numeral 1 in FIG. 1A. As illustrated in FIG. 1A, the multicast discovery message 1 will be broadcast on the network 102 to all of the discovery aware agents 120. The multicast discovery message 1 is in a format which contains command instructions for all of the discovery aware devices 120 connected to the network 102 to reply to it. Accordingly, at least some of the discovery aware agent devices 120 connected to the network 102 will respond to the multicast discovery message 1 with a discovery acknowledge unicast message, identified generally by reference numeral 2. The discovery acknowledge unicast message 2 will comprise at least the unique agent address 122 of the corresponding agent device 120 which is sending the discovery acknowledge unicast message 2.

The management station 110 will then receive the discovery acknowledge unicast messages 2 from the at least some of the discovery aware agent devices 120 connected to the network 102 which received the multicast discovery message 1. For every unicast discovery acknowledge message 2 that the management station 110 receives, the management station 110 will then send a unicast discovery registration message, shown generally by reference numeral 3. The registration agent 113 of the management station 110 will also register the agent addresses 122 of the discovery aware agent device 120 that sent the corresponding discovery acknowledgement message 2, to permit further communication to the discovery aware agent device 120. Registering the agent address 122 at the management station 110 may include storing the agent address 122 in a log or lookup table permitting the management application 111 to then send other messages to the now registered agent device 120.

In some cases, for whatever reasons, the discovery aware agent devices 120 may not receive the multicast discovery message 1 and therefore may not respond with the discovery acknowledge unicast message 2. In other cases, for whatever reason, the discovery acknowledge unicast message 2 may be sent by a discovery aware agent device 120, but simply not be received by the management station 110.

For example, as illustrated in FIG. 1A, only three of the agent devices 120, namely the agents 120*b, c, d* in the middle of the network 102 returned a discovery acknowledge unicast message 2. In response to the discovery acknowledge unicast message 2, the management station 110 will send the unicast registration message, identified generally by reference numeral 3. The unicast registration message 3 will be sent to the agent devices 120*b, c, d* which sent the discovery acknowledge unicast message 2 using the unique agent address 122 that was contained in the discovery acknowledge unicast message 2. At that point, the current session for communication will be established, at least for the discovery aware agent devices 120*b, c, d* that receive the unicast registration message 3. These registered agent devices 120 will then not respond to any subsequent rediscovery messages, shown generally by reference numeral 11, for the same current session as discussed more fully below.

As illustrated in FIG. 1A, the two agent devices 120*a,e* at either end of the network 102 are shown in FIG. 1A as not having sent the discovery acknowledge unicast message 2. In order to discover any agent devices 120*a, e* that did not respond to the initial discovery message 1, the management station 110 will periodically send rediscovery messages 11. As illustrated in FIG. 1A, the multicast rediscovery message 11 will be sent to the entire network 102. However, the three agent devices 120*b, c, d* in the middle of the network 102 that sent the device acknowledge unicast message 2 and received the device unicast registration message 3 will not respond to the rediscovery multicast message 11 because they have received a registration message 3 for the current session. However, in the embodiment illustrated in FIG. 1A, the agent devices 120*a, e* at either end of the network 102, which, for whatever reason, did not send a discovery acknowledge massage 2 will respond to the multicast rediscovery message 11 with a rediscovery acknowledge unicast message 12.

The rediscovery acknowledge unicast message 12 will be similar to the discovery acknowledge unicast message 2 in that it contains the unique address 122 of the device 120 sending the rediscovery acknowledge unicast message 12. In this way, the management station 110 will eventually acquire the unique address 122 of the agent devices 120*a, e* which did not respond to the initial multicast discovery message 1. The management station 110 will then send a rediscovery unicast registration message 13 to each of the agent devices 120*a,e* which sent the rediscovery acknowledge unicast message 12. At that point in time, the agent devices 120*a, e* receiving the rediscovery unicast registration message 13 will not respond to any other rediscovery multicast messages 11 identifying the current session. The management station 110 will then store the unique addresses 122 for all of the agent devices 120*a,e* that have sent, and which the management station 110 has received, a corresponding rediscovery acknowledge unicast message 12. In this way, the management device 110 can then communicate further with the specific agent device 120*a,e* to further configure the agent 121 and facilitate further communication to each of the agent devices 120 on the network 102.

In a preferred embodiment, the rediscovery messages 11 can be sent periodically in order to ensure that any agent devices 120 that have not been discovered, for whatever reason, are then discovered. In this way, any devices 120 that have not received a discovery unicast registration message 3 or a rediscovery unicast registration message 13 will respond to subsequent rediscovery messages 11 and be discovered. Furthermore, the rediscovery message 11 can be sent in order to discover any agent devices 120 which have been recently added to the network 102. The time period in which the rediscovery message 11 is sent can, ideally, be configured by the administrator of the network 102. Because the number of agent devices 120 responding to the rediscovery message 11 will likely be small, the rediscovery multicast message 11 does not cause a large disruption to the network 102. Furthermore, the rediscovery multicast message 11 is generally a smaller frame in size so as not to greatly affect the other communications occurring on the network 102. Because of this, in one preferred embodiment, the rediscovery multicast message 11 can be sent every five seconds.

Figure 5A:
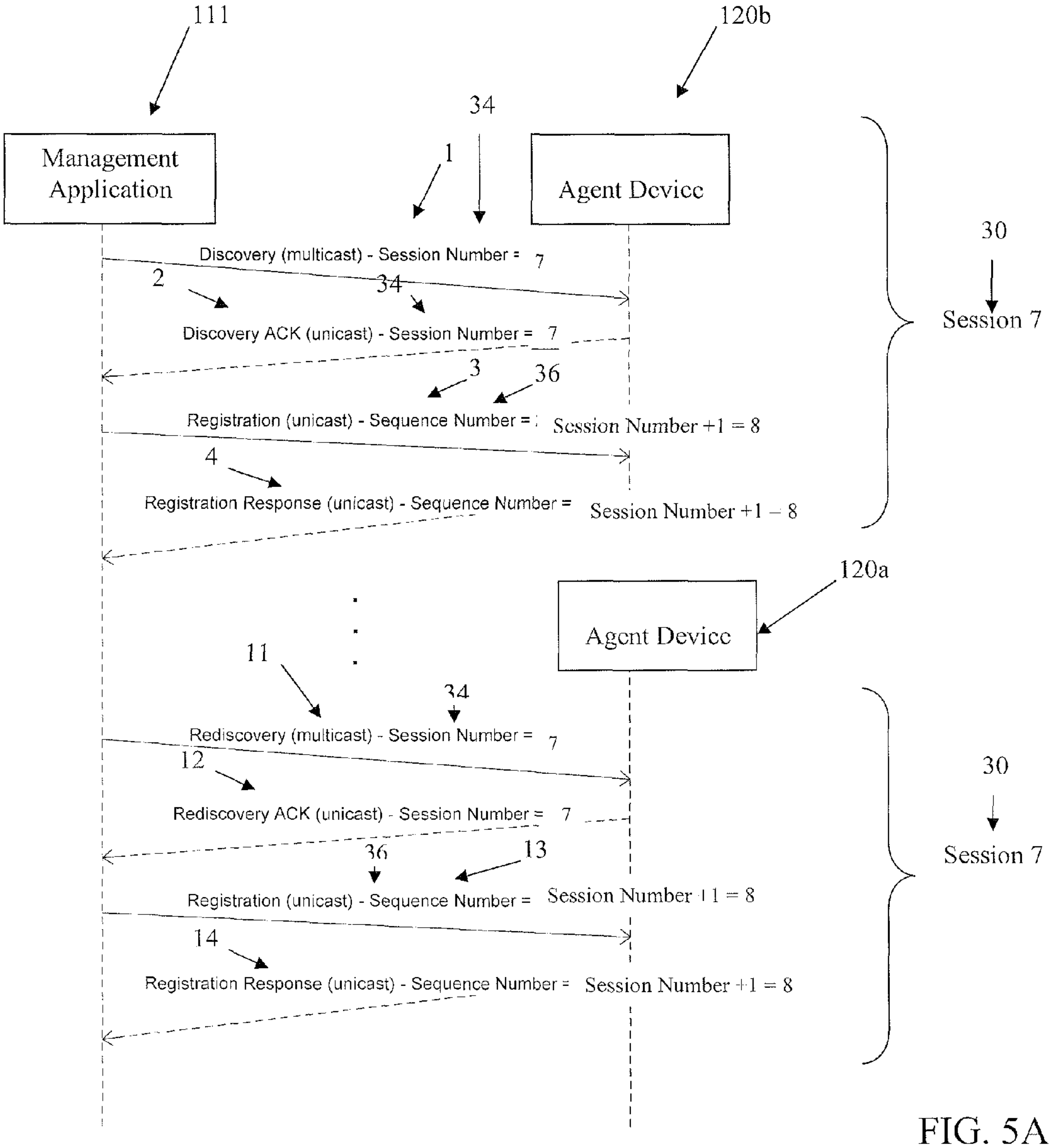
FIG. 5A illustrates a Discovery and Rediscovery Frame Exchange Diagram according to one embodiment of the present invention.

FIG. 5A illustrates a discovery frame exchange diagram showing the exchange of frames between the management station application 111 being executed on the management station 110 and one of the agent devices 120 connected to the network 102. As illustrated in FIG. 5A, the management station application 111 being executed on the management station 110 will forward a multicast discovery message 1 on the network 102 to all of the discovery aware agent devices 120 connected to the network 102. For ease of reference, only one agent device 120*b* is shown in the top part of FIG. 5A and only agent device 120*a* is shown in the bottom part of FIG. 5B. As illustrated in FIG. 5A, the discovery multicast message 1 will have a session number 34 which, in this embodiment, has a value of "7". However, it is understood that the session number 34 can be any value which can be accommodated within the session field 236, discussed more fully below. Furthermore, in an a preferred embodiment, the session number 34 is arbitrarily selected at random, but can be selected in any other manner.

The agent device 120*b* as shown in FIG. 5A will then send the discovery acknowledge unicast signal 2. The discovery acknowledge unicast signal 2 will also comprise the session number 34 identifying the current session which, in this embodiment, is identified by the value "7". Upon the management station 110 receiving the discovery acknowledgement unicast signal 2, the management application 111 will be able to extract the agent address 122 for the agent device 120*b* having sent the corresponding agent acknowledge signal 2. The registration agent 113 of the management station

110 will then register the agent device 120*b* which sent the corresponding discovery acknowledge signals 2 be storing the agent address 122 for the agent device 120*b*.

The management station application 111 then causes the management station 110 to send the registration signal 3. The registration signal 3 will have a sequence number 36 based on the value "7" of the session number 34. As illustrated in FIG. 5A, the sequence number 36 is equal to the session number 7 plus one or having the value "8". It is understood that the sequence number 36 may be based on the session number 34 in any other manner. The agent device 120 receiving the registration message 3 with the sequence number 36 based on the session number 34 of the current session 30, namely, the value "8" will know that the management station 110 has received the discovery acknowledge message 2 and that the agent device 120*b* has been registered with the management station 110. While not necessary, the agent device 120 may then send a discovery unicast acknowledge message, as shown generally by reference numeral 4, identifying the same sequence number 36 in the registration message 3. This provides added security by permitting the management station application 111 executing on the management station 110 to know that the agent device 120*b* has received the registration message 3. At this point in time, the registration of this particular agent device 120*b* has been completed. The agent device 120*b* will not respond to any rediscovery messages 11 having a session number 34 which equals the current session number value which, in this example, is "7".

A further rediscovery multicast message 11 having the same session number value "7" is sent to the agent device 120*b* will not illicit any type of response. However, the agent device 120*a*, which has not been previously registered, will respond to the rediscovery message 11 having the session number 34 with the same value of "7" with a rediscovery acknowledge unicast message 12 having the same session number value "7" identifying the current session 30. The rediscovery acknowledge message 12 will also comprise the agent address 122 of the agent device 120*a* which agent address 122 can be extracted by the management station application 111 from the rediscovery acknowledge unicast message 12 to permit registration of the agent device 120*a* as discussed above.

The management application 111 will then send the registration unicast message 13 having a sequence number 36 based on the session number value of "7". In this embodiment, similar to that discussed above, the sequence number value will be the session number plus 1 which, in this case, would be "8". At this point in time, the agent device 120*a* will know that the application agent 111 has registered it and the agent device 120*a* will not respond to any other rediscovery messages 11 having a session number 34 with the same value of "7" identifying the same current session 30.

Figure 5B:
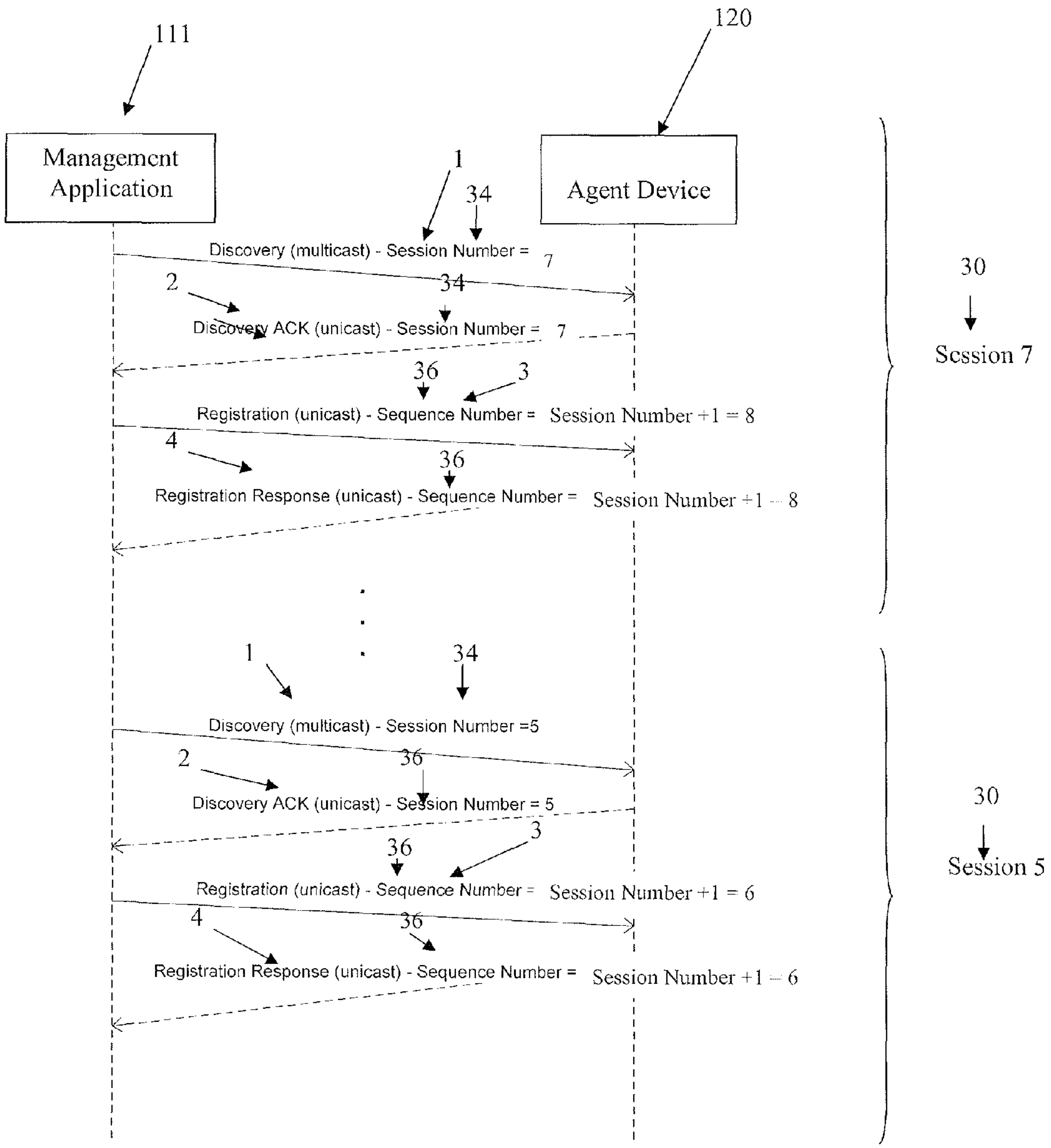
FIG. 5B illustrates a Discovery and subsequent new Discovery Frame Exchange Diagram according to one embodiment of the present invention.

FIG. 5B illustrates a further preferred embodiment. In the top part of FIG. 5B the current session "7" is established as discussed above with respect to FIG. 5A. However, in bottom part of FIG. 5B, after the discovery message 1 having session number value "7", a new discovery message 1 is sent having a different session number value "5" identifying a new session 30, different from the previous session value 7. The discovery message 1 having the new session value "5" will then cause all of the agent devices 120 to send a return acknowledgement message 2 because the session number value "5" of this discovery message 1 is different from the session number value "7" of the previous session 30. The sessions 30 are identified in FIG. 5B by session "7" at the top and session "5" at the bottom reflecting the value of the session numbers 34.

As also illustrated in FIG. 5B, the management application 111 will send a registration message 3, as discussed above, to any agent device 120 which sends a discovery acknowledge signal 2. And, as identified above, the sequence number 36 for the registration message 3 will be based on the session number. However, for session "5", the first sequence number 36 will have a value "6", which represents the current session number value, namely "5" plus one. It is understood, however, that any other type of relationship between the sequence number 36 of the registration message 3 and the session number 34 may be developed provided the sequence number 36 is based on the session number 34 so that the agent device 120 will be aware that the management application 111 has received a discovery acknowledge message 2 and has registered the agent device 120. The agent device 120 may then respond with the registration acknowledge message 4 again having the sequence number 36 with the same value as the sequence number 36 of the registration number 3.

Figure 5C:
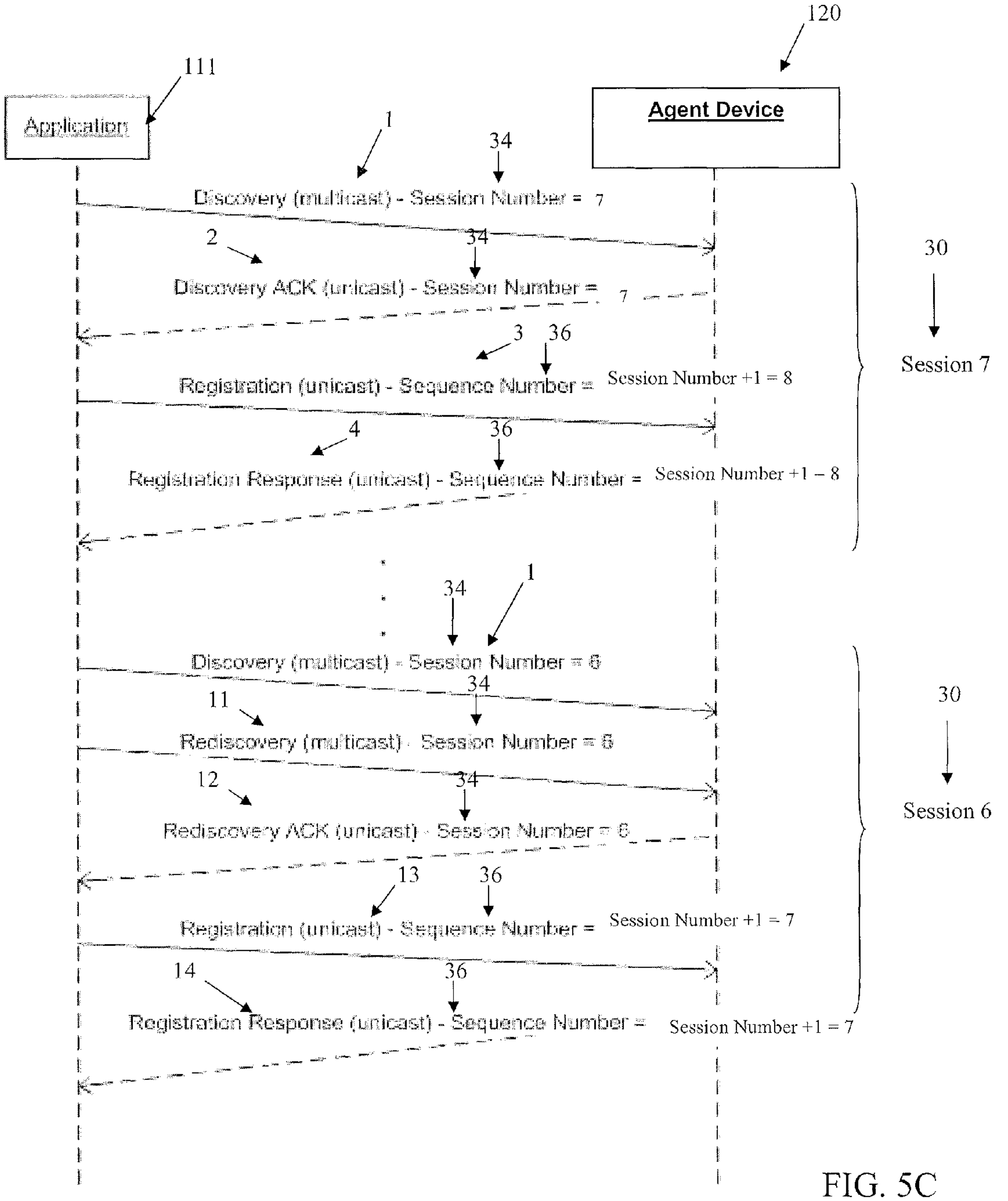
FIG. 5C illustrates a Discovery, a subsequent new Discovery and a Rediscovery in the new session Frame Exchange Diagram according to one embodiment of the present invention.

FIG. 5C shows a further example of a preferred embodiment of the present invention. As illustrated in FIG. 5C at the top portion, the current session value "7" is established with an application device 120. This can be done in the manner as discussed above, for instance, in FIG. 5A.

In the bottom part of FIG. 5C, a new session "6" is established. This is initially established by the discovery message 1 having session number 34 with a value "6" which is different from the previous session number value of 7 and therefore a new session 30 is established. However, the agent device 120, for whatever reason, does not send a discovery acknowledge message 2 for session "6". Because of this, when the management station 110, through the management station application 111, sends the rediscovery broadcast message 11 having the same session number value "6", the agent device 120 will respond with a rediscovery acknowledge signal 12 having the same session number value "6" identifying the current session 6. It will be understood that between the time period the discovery message 1 having session number value "6" was set and the rediscovery acknowledge message 12 having session number value"6" from the agent device 120 was received by the management station 110, the agent device 120 would not have been "discovered" by the management station 110. Because of this, no communication would have occurred between the management station 110 and the agent device 120.

Once the management station 110 receives the registration acknowledge message 12, the agent device 120 will then be re-registered with the new session "6". The registration signal 13 having a sequence number 36 based on the current session value "6" will then be sent to the network device 120. As was the case above, the sequence number value "7" will simply be the session number 34 plus one. The network device 120 can then respond with a rediscovery registration acknowledge message 14.

At this point, the network device 120 will not respond to any other rediscovery messages 11 having the session number value "6" identifying the current session 6. Furthermore, at this point, the management station 110 can commence communication to the network device 120. The management station 110 will need to send to the management station 120 any new configurable information which was not previously sent during session "6". The agent device 120 may also erase any configuration information that was previously sent during the previous session "7" by the management station 110 and/or the management station 110 may cause the network device 120 to erase any previous configuration information.

It is understood that the discovery unicast registration message 3 and the rediscovery unicast registration message 13 may be substantially similar in format, and, for ease of reference, may be referred to interchangeably herein. Furthermore, the agent devices 120 may also send a discovery registration acknowledge and a rediscovery registration acknowledge messages 4, 14 which are also similar to each other. The discovery registration acknowledge message 4 and the rediscovery registration acknowledge message 14 are similar in function, namely to acknowledge receipt by the agent device 120 of the registration message 3, 13.

Figure 1C:
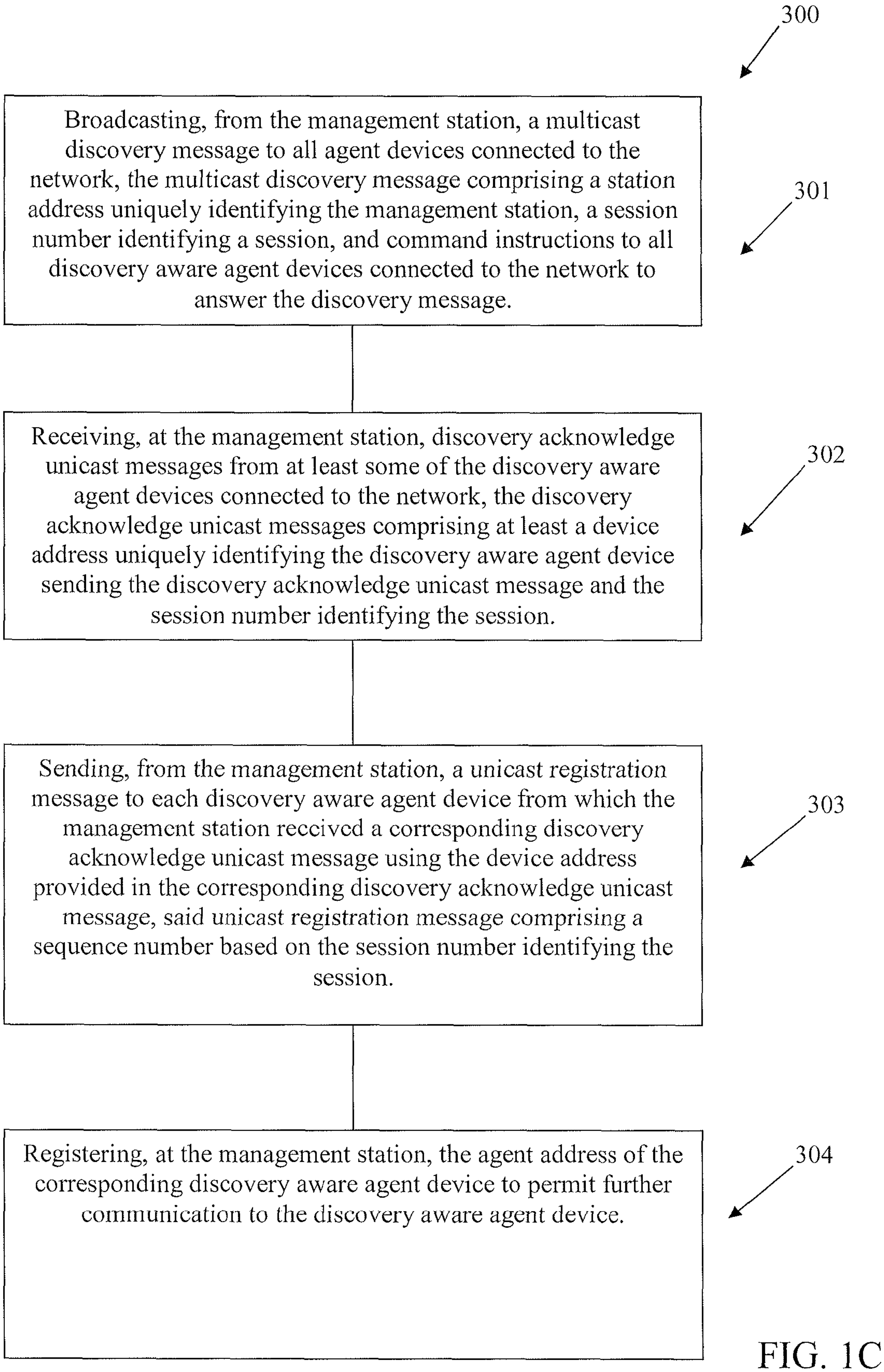
FIG. 1C is a flowchart showing the Discovery process according to one embodiment of the present invention.

FIGS. 1C to 1F illustrate the method for discovering the agent devices 120 connected to the network 102 which has been described above. In particular, FIG. 1C illustrates the discovery process, identified generally by reference numeral 300. This discovery process 30 is similar to that discussed above with respect to FIGS. 1A, 1B and 5A. In particular, the process 300 comprises the initial step 301 of broadcasting from the management station 110 a multicast discovery message 1 to all of the agent devices 120 connected to the network 102. The multicast discovery message 1 will comprise the station address 112 and the session number 34. The station address 112 uniquely identifies the management station 110 and the session number 34 uniquely identifies the session 30. The broadcast discovery message 1 will also have instructions to all of the discovery aware agent devices 120 connected to the network 102 to answer the discovery message 1.

In the next step 302, the management station 110 will receive the discovery acknowledge unicast messages 2 from at least some of the discovery aware agent devices 120 connected to the network 102. The discovery acknowledge unicast messages 2 will comprise at least the agent address 122 uniquely identifying the discovery aware agent device 120 sending the discovery acknowledge unicast message 2 and will also have the session number 34 identifying the session 30 which appeared in the multicast discovery message 1.

In step 303, the management station 110 sends a unicast registration message 3 to each discovery aware agent device 120 from which the management station 110 received a corresponding discovery acknowledge unicast message 2. In so doing, the management station 110 will use the device address 122 provided in the corresponding discovery acknowledge unicast message 2 received from the agent device 120. The unicast registration message 3 will also comprise a sequence number 36 based on the session number 34 identifying the session 30.

As indicated in step 304, after receiving the discovery acknowledge unicast message containing the device address 122 uniquely identifying the discovery aware agent device and sending the corresponding discovery acknowledge unicast message 122, the management station 110 will register the agent address 122 of the corresponding discovery aware agent device 120. In this way, further communication to the discovery aware agent device 120 which sent the corresponding discovery acknowledge unicast message 2 will be facilitated. Furthermore, once the agent device 120 receives the registration message 3, the agent device 120 will not respond to any rediscovery multicast messages 3 having a session number 34 with the same value as the session number of the discovery message 1.

Figure 1D:
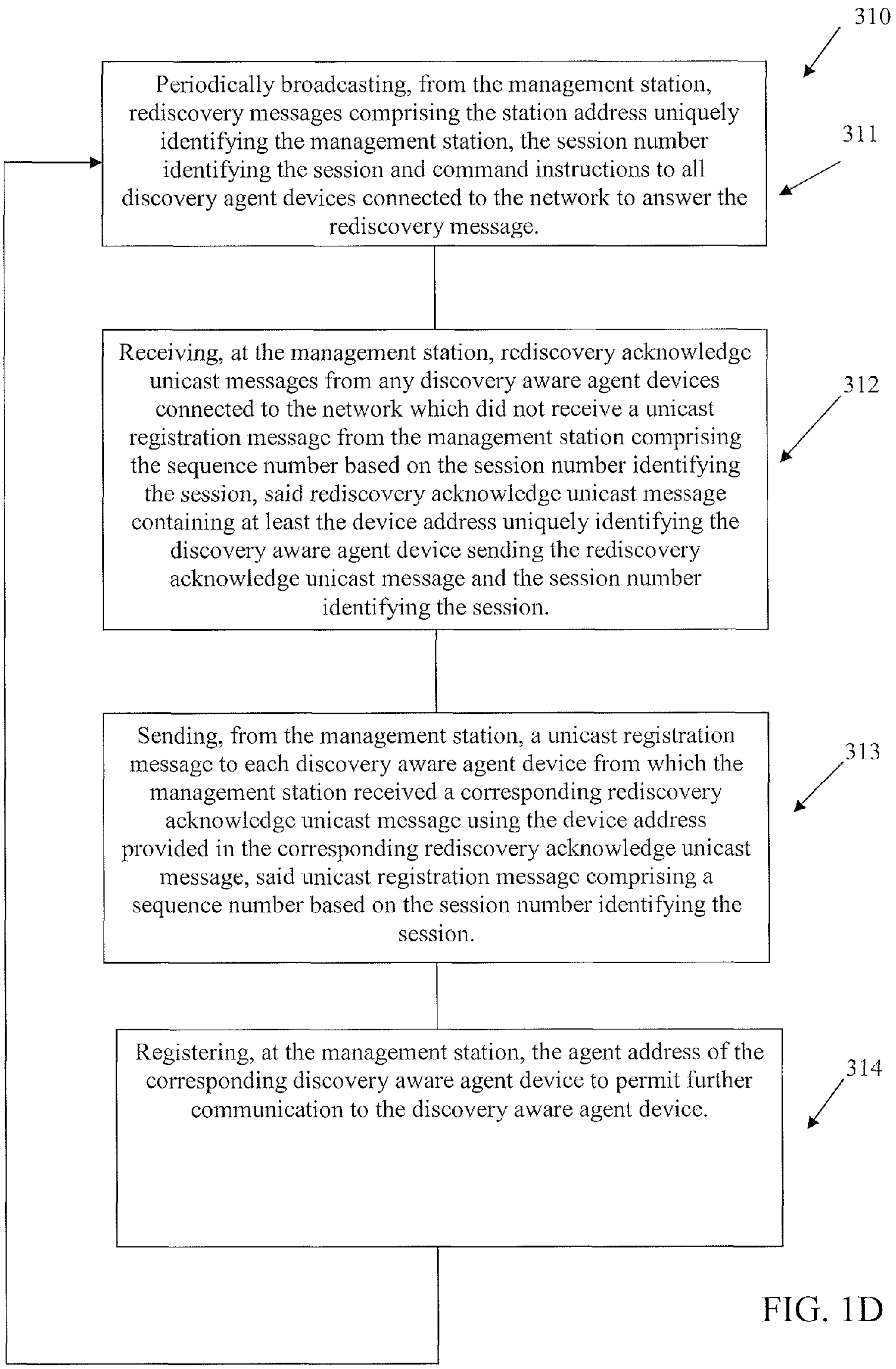
FIG. 1D is a flowchart showing the Rediscovery process according to one embodiment of the present invention.

FIG. 1D illustrates the process for broadcasting the rediscovery message according to one preferred embodiment. As illustrated in step 311, the management station 110 will periodically broadcast rediscovery messages 11. The rediscovery messages 11 will be similar to the discovery messages 1 in that they comprise the station address 112 of the management station 110 and also the session number 34 having the same value as the initial discovery message 1, identifying the current session 30. The rediscovery messages 11 will also have command instructions to all of the discovery aware agent devices 120 connected to the network 102 to answer the rediscovery message 11.

As illustrated in step 312, the management station 110 will then receive the rediscovery acknowledge unicast message 12. The rediscovery acknowledge messages 12 will be received from any discovery aware agent devices 120 connected to the network 102, which has not previously received the unicast registration message 3 from the management station 112. It is understood, however, that not all of the agent devices 120 which did not previously receive a unicast registration message 3 from the management station 110 for the current session 30, may respond to the rediscovery multicast messages 11. For whatever reason, the agent devices 120 which did not receive a registration message 3 may nevertheless not respond to the rediscovery multicast messages 11. Therefore, while only discovery aware agents 120 connected to the network 102 which did not previously receive a unicast registration message 3 from the management station 110 can respond to the rediscovery multicast message 11, not all of the discovery aware agent devices 120 connected to the network 102 which did not receive a unicast message registration message 3, will necessarily respond to the rediscovery multicast message 11. The agent devices 120 which do respond to the rediscovery multicast messages 11 will send the rediscovery acknowledge unicast message 12 containing at least the device address 122 uniquely identifying the discovery aware agent 120 sending the rediscovery acknowledge unicast message 12 as well as the session number 34 identifying session 30.

In step 313, the management station 110 sends the rediscovery unicast registration messages 13, which is similar to the discovery unicast registration message 3 discussed above in step 303. In step 314, management station 110 will register the agent address 122 of the discovery aware agent device 120 which sent the corresponding rediscovery acknowledge unicast message 12 to permit further communications and discovery aware agent device 120. These steps 311 to 314 will then be periodically repeated to facilitate discovery of protocol aware agent devices 120 that are now connected to the network 102 or that are connected in the future.

Figure 1E:
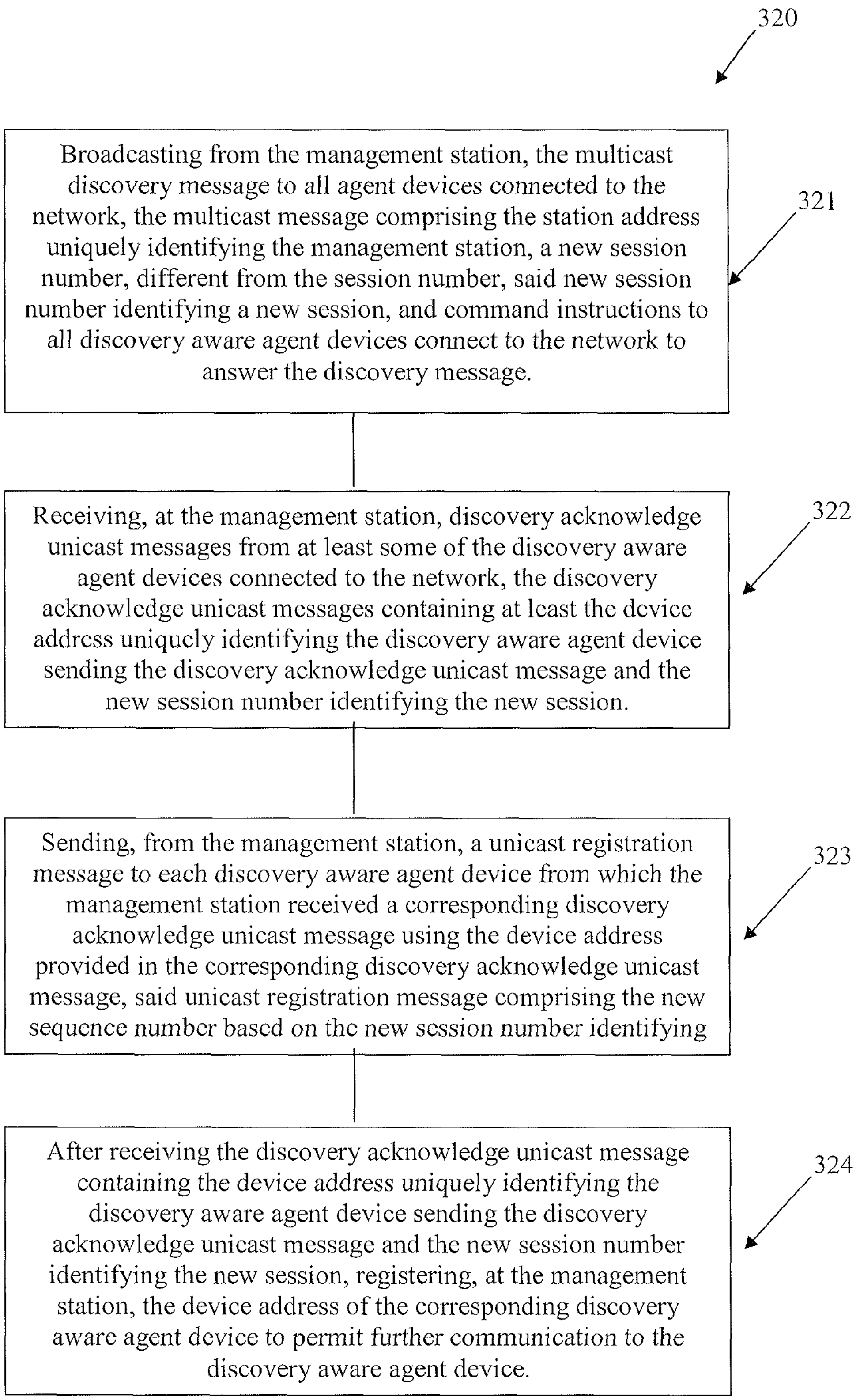
FIG. 1E is a flowchart showing the Discovery process for a new session according to one embodiment of the present invention.

FIG. 1E illustrates the process 320 used by the management station 110 when a new session 30 is commenced. In the new session 30, a new multicast discovery message 1 will be sent to all of the agent devices 120 connected to the network 102. The multicast discovery message 1 in step 321 will be similar to the multicast discovery message 1 in step 301, except that the session number 34 can have a new value, different from the value of the session number 30 in step 301, as discussed above for instance in FIG. 5(*b*). Steps 321, 322, 323 and 324 mirror steps 301, 302, 303 and 304, illustrated in FIG. 1C, except for the session number 34 having the new value and identifying the new session 30.

Figure 1F:
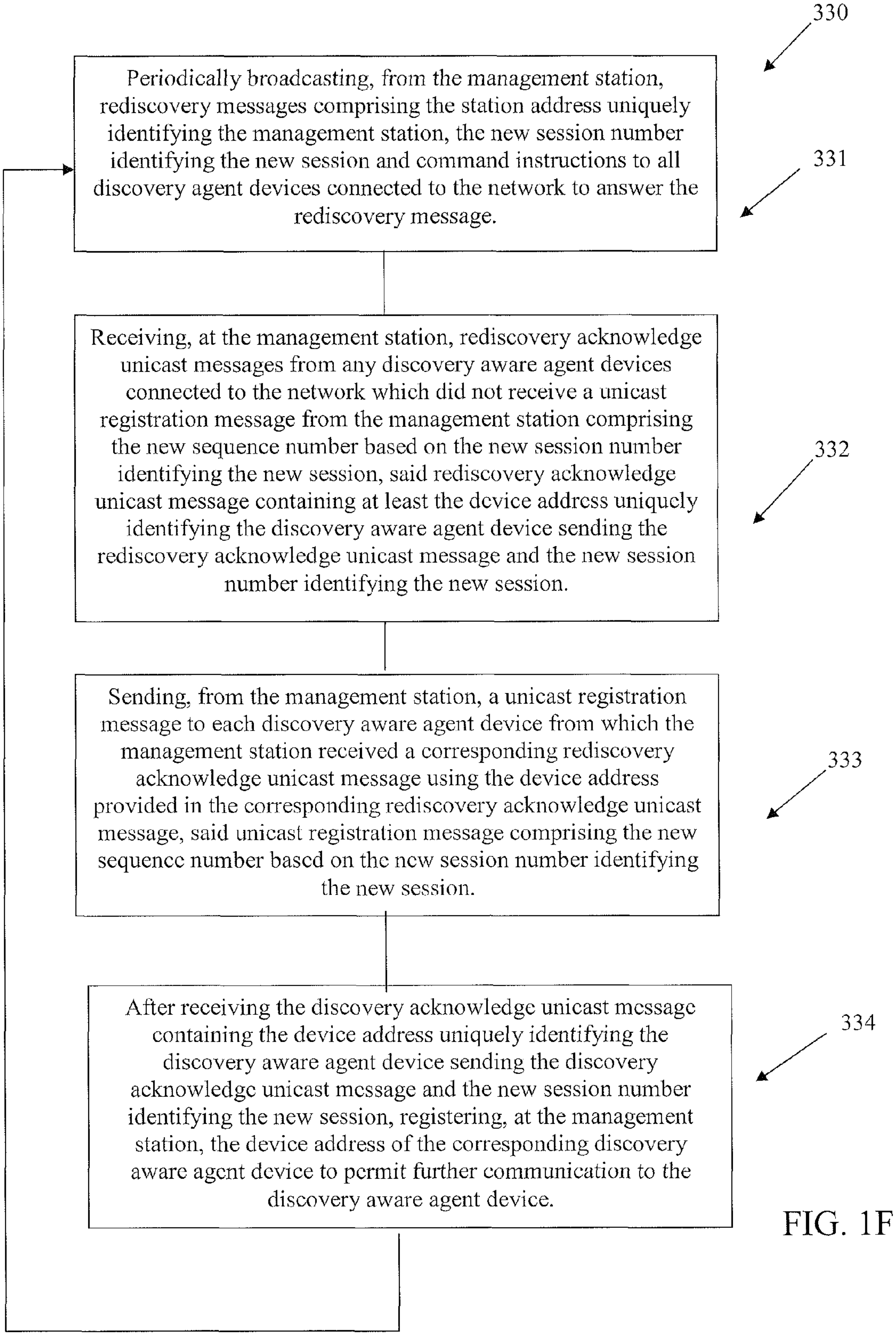
FIG. 1F is a flowchart showing the Rediscovery process for a new session according to one embodiment of the present invention.

Likewise, FIG. 1F illustrates the rediscovery process for a session number 34 having a new value and identifying a new session 30. Steps 331, 332, 333 and 334 mirror steps 311, 312, 313 and 314, of FIG. 1D, except that they relate to the session number 34 having the new value and identifying the new session 30 which is new and different from the session illustrated in FIGS. 1C and 1D. This process 330 is similar to that illustrated in FIG. 5C and discussed above. Steps 331 to 334 will also be periodically repeated, but with the session number 34 having the new value identifying the new session 30, to facilitate discovery in the new session 30 of the protocol aware agent devices 120 that are now connected to the network 102 or that are connected in the future.

Figure 2:
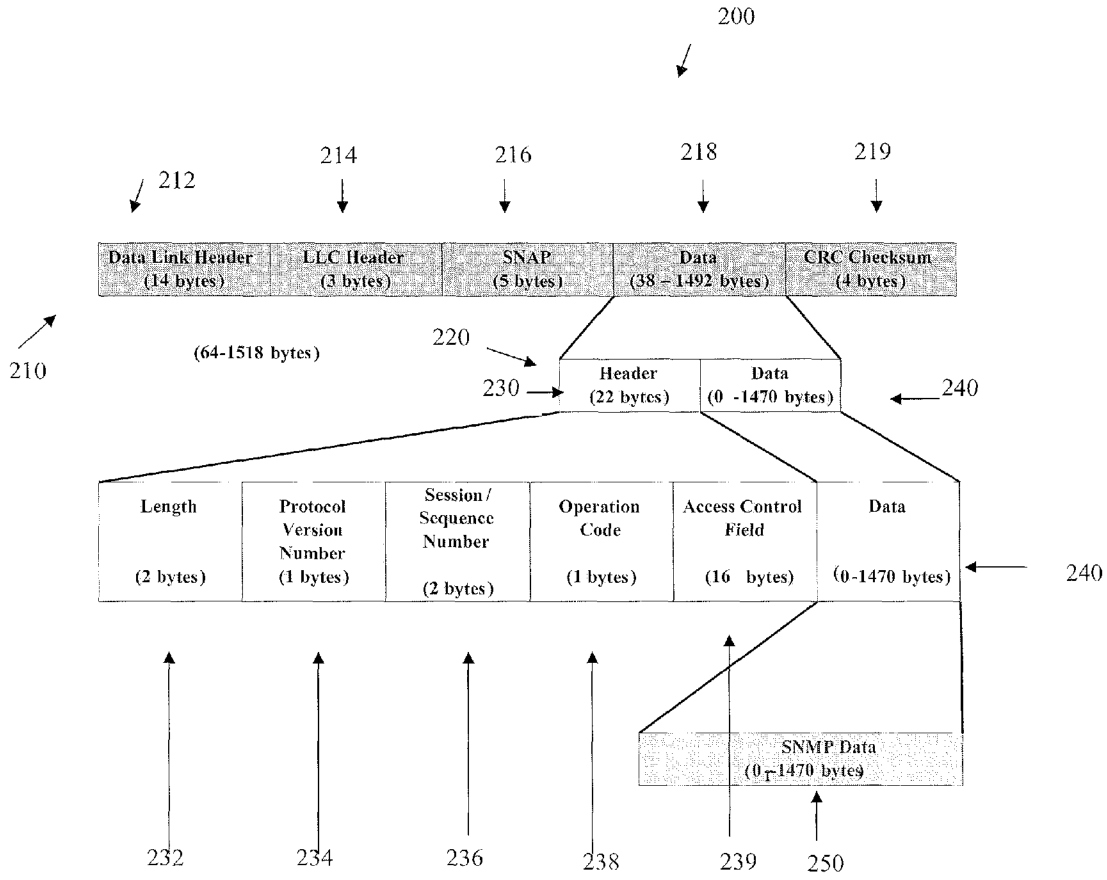
FIG. 2 illustrates a Discovery Protocol Frame Layout encapsulated in an Ethernet Frame Layout according to one aspect of the present invention.

As illustrated in FIG. 2, the discovery protocol frame 220 encapsulated within an Ethernet protocol frame 200 will have a discovery header 230 and discovery data 240. The data in discovery data field 240 may be any data that can be transmitted between the management station 110 and the agent devices 120. In this way, data may be transmitted to the agent devices 120 even when the agents 121 have been configured to communicate only in the Ethernet protocol and the discovery protocol of the discovery protocol frame 220. In a further preferred embodiment, as illustrated in FIG. 2, the discovery data 240 may further comprise data encapsulated therein in some further management protocol, for example Simple Network Management Protocol (SNMP) data 250, but not necessarily restricted to SNMP. In this way, the Ethernet protocol frame 200 may comprise within the Ethernet data field 218 a discovery protocol frame 220 having data in data field 240 which has encapsulated therein data in a further protocol, different from the discovery protocol frame 220, such as SNMP illustrated by the SNMP data 250 in FIG. 2. Therefore, the data in the discovery protocol data field 240 may comprise data in SNMP protocol, illustrated generally by the SNMP data 250, or, data in any other protocol format which can be understood by the agents 121, for use by the agent devices 120. This improves the flexibility of the management of the device by permitting SNMP data 250, or any other protocol, to be transferred to and from agent devices 120 after they have been discovered and registered by the management unit 110, even before the agents 121 have been fully configured for communicating using a protocol other than the Ethernet protocol which uses an Ethernet protocol frame 200. It is understood that the invention is not limited to data encapsulated in the discovery protocol data field 240 in the SNMP protocol, but data in other protocols may also be transmitted.

The discovery protocol frame 220 will also have a discovery header 230 separate from the data link header 212 of the Ethernet protocol frame 200. As illustrated in FIG. 2, the discovery header 230 will comprise a length field 232, a protocol version number field 234, a session/sequence number 236, an operation code field 238 and an access control field 239.

The length field 232 will identify the total length of the data portion of the discovery protocol frame 220 in bytes. The protocol version number field 234 will identify the version of the discovery protocol 220 being run by the management station 110. The access control field 239 is a field containing an agreed upon exchange of information validated by the device 120 granting this management station 110 access to the device 120 and allowing management station 110 to accept responses from the device 120.

The operation code field 238 will contain the command instructions. In a preferred embodiment, the operation code field 238 will contain 1 byte of information identifying several potential command types as outlined in the following table.

| Command | Code |
|---|---|
| Data | 0x00 |
| Discovery | 0x01 |
| DiscoveryAck | 0x02 |
| Error | 0x03 |
| ReDiscover | 0x04 |
| ReDiscoverAck | 0x05 |
| Identify | 0x06 |
| IdentifyAck | 0x07 |
| IdentifyNack | 0x08 |

-continued

| Command | Code |
|---|---|
| Get | 0x0C |
| GetAck | 0x0D |
| GetNack | 0x0E |
| Set | 0x0F |
| SetAck | 0x10 |
| SetNack | 0x11 |
| ResetAck | 0xFE |
| Reset | 0xFF |

As indicated above, the operation code field 238 will have a value of 0x01 for discovery messages 1 and a value of 0x04 for rediscovery messages 11. The discovery acknowledge signal 2 will have a value of 0x02 and the rediscovery acknowledge signal 12 will have a value of 0x05. The other command instructions are apparent from the above table and will be discussed in further detail below.

The sequence/session number field 236 will identify the session number 34 for discovery messages, rediscovery messages, discovery acknowledge message and rediscovery acknowledge messages 1, 11, 2, 12. For any other types of data or command messages other than discovery, discovery acknowledge, rediscovery, rediscovery acknowledge 1, 2, 11, 12, the session/sequence number field 236 will contain the sequence number 36. This is also the case particularly with respect to registration messages 3, 13 and also the registration acknowledge messages 4, 14. In a preferred embodiment, the registration messages 3, 13 may simply be one of the other messages identified in the table above, such as a get message 601, a set message 701 an identify message 801 or data messages 901 discussed more fully below. In a preferred embodiment, the registration messages, 3, 13 comprise get messages having a command type value 0x0C in the operation code field 238. In this way, the registration messages 3, 13 can also perform an indirect function of obtaining information from the agent device 120 in addition to the agent address 122, which would be contained in the discovery acknowledge message 2 or rediscovery acknowledge message 12.

Figure 3:
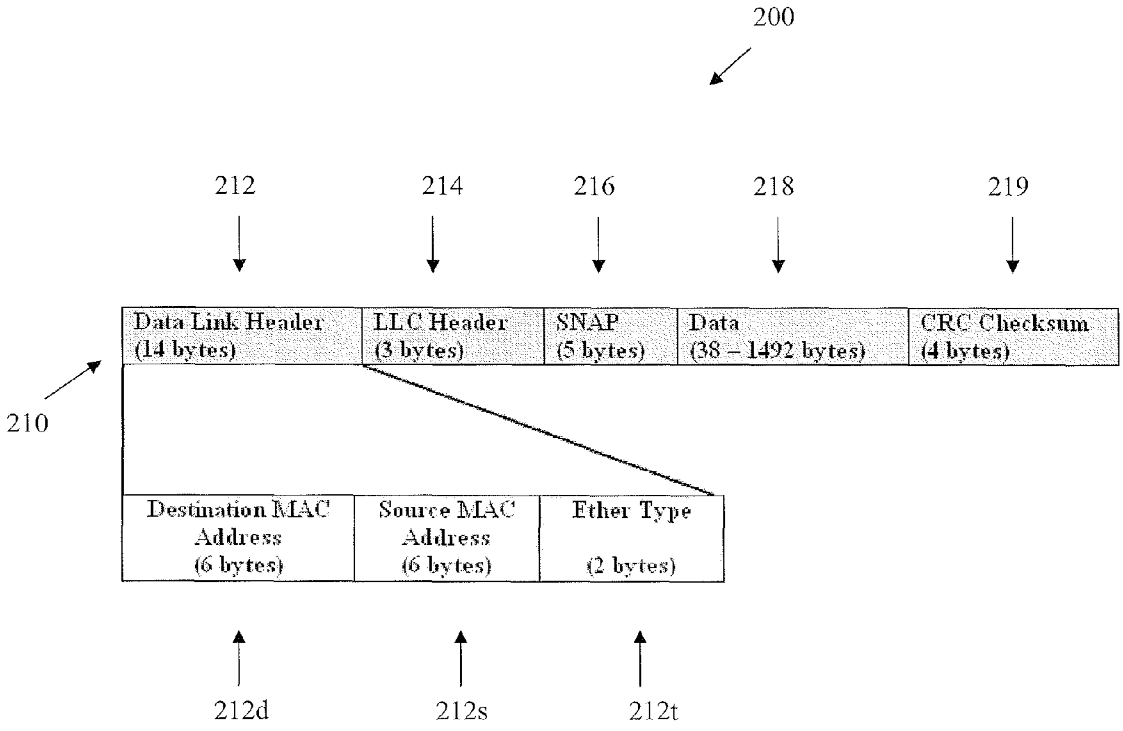
FIG. 3 illustrates an Ethernet Frame Layout.

FIG. 3 illustrates an Ethernet protocol frame, shown generally be reference numeral 200, that may be used to transfer the discovery and rediscovery messages 1, 2, 3, 4, 11, 12, 13 and 14 as discussed above, according to one preferred embodiment of the present invention where the network 102 utilizes an Ethernet protocol. As illustrated in FIG. 3, the Ethernet frame 200 may comprise an Ethernet header 210. As illustrated in FIG. 3, the Ethernet header 210 will comprise the data link header field 212, an LLC header field 214, an SNAP data field, data field 218 and a CRC checksum field 219.

As also listed in FIG. 3, the data link header field 212, which in one preferred embodiment comprises 14 bytes, comprises the destination MAC address (6 bytes) identified by reference numeral 212*d*, the source MAC address (6 bytes) identified by reference numeral 212*s*, and the Ether type field (2 bytes) identified by reference numeral 212*t*. The destination MAC address field 212*d* will contain the MAC address of the agent device 120 or the management station 110, depending on whether the Ethernet Frame 200 is being sent to an agent device 120 or to the management station 110. The Ethernet Frame 200 will also comprise the source MAC address field 212*s* identifying the source, namely the agent devise 120 or the management station 110, from which the Ethernet Frame 200 emanated.

It is understood that for the discovery multicast message 1 and the rediscovery multicast messages 11, the source MAC address 212*s* will contain the management station address 112, which in a preferred embodiment will be the station MAC address 114. In this way, the agent device 120 receiving the discovery messages 1 and the rediscovery messages 11 will be able to obtain the station MAC address 114 from the discovery and rediscovery messages 1 and 11 respectively.

Similarly, the discovery acknowledge messages and rediscovery acknowledge messages 2, 12, will contain in the source field 212*s*, the agent address 122 which in this preferred embodiment will be the agent MAC address 124 uniquely identifying the agent device 120 which sent the discovery acknowledge or rediscovery acknowledge message 2, 12. In this way, the management station 110 can obtain the agent address 122 from the source field 212*s* for each of the agent devices 120 which sent the corresponding discovery acknowledge or rediscovery acknowledge messages 2, 12.

The other fields 214, 216 and 219 of the Ethernet Frame 210 will perform a function which is standard to Ethernet protocol information.

However, the data field 218 will contain the discovery protocol header 220 encapsulated therein. In this way, the data field 218 of the Ethernet protocol message 200 will comprise data for the agent devices 120 in a further discovery protocol, different from the Ethernet protocol message 200.

Figure 4A:
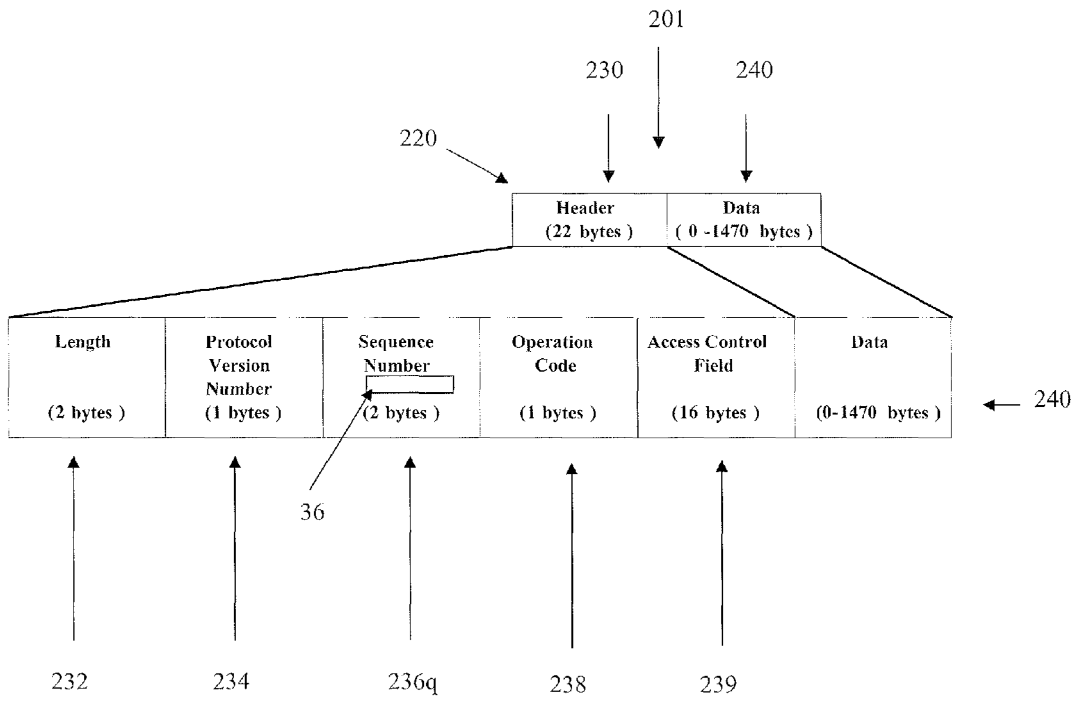
FIG. 4A illustrates a Data and Command Frame Layout other than a Discovery or Rediscovery Frame.
Figure 4B:
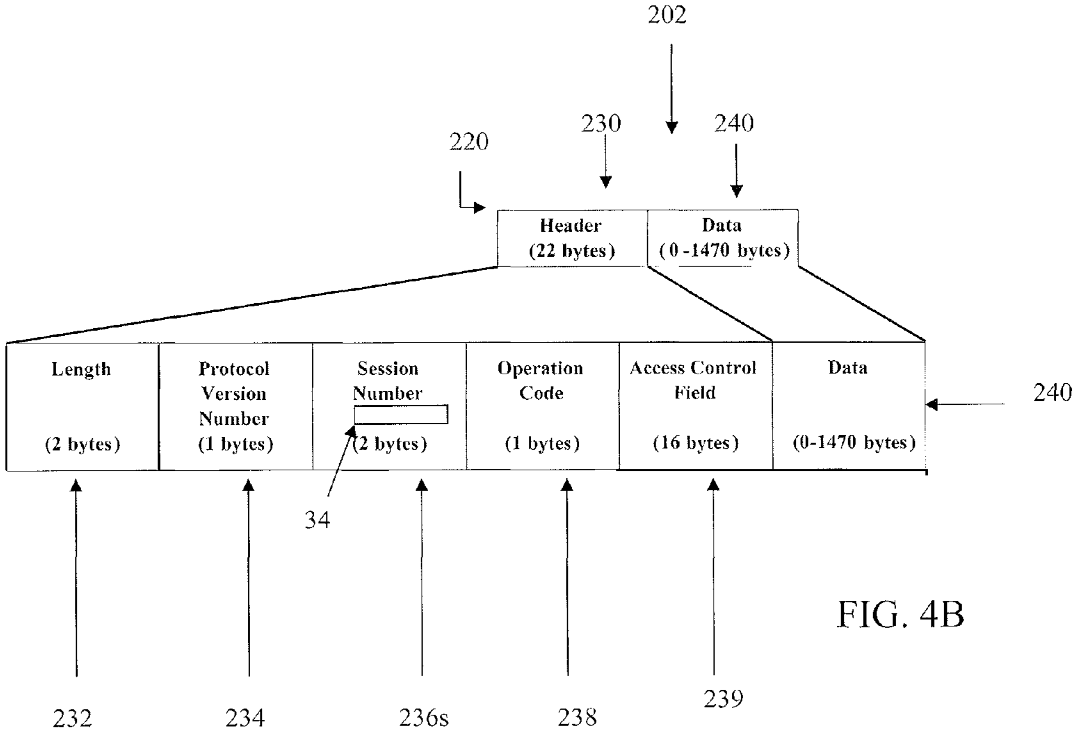
FIG. 4B illustrates a Discovery or Rediscovery Frame Layout according to one embodiment of the present invention.

FIG. 4A illustrates the data and command frame layout, other than a discovery or rediscovery frame, shown by reference number 202 in FIG. 4A. FIG. 4B illustrates a discovery or rediscovery frame layout as well as the discovery acknowledge and rediscovery acknowledge frame layout shown generally by reference numeral 201 in FIG. 4B. A comparison of FIGS. 4A and 4B will indicate that the significant difference between FIGS. 4A and 4B is that in FIG. 4A the protocol frame 220 has a sequence number field 236*q* containing the sequence number value 34 and in FIG. 4B the discovery protocol field 220 has a session number field 236*s* containing the session number value 34. The session number value stored in the session number field 236*s* and the sequence number value stored in the sequence number field 236*q* will be as discussed above for the discovery message, discovery acknowledge, discovery registration message and discovery registration acknowledge message 1, 2, 3, 4 and the rediscovery message, rediscovery acknowledge message, rediscovery registration message and rediscovery registration acknowledge messages 11, 12, 13, 14.

Figure 6:
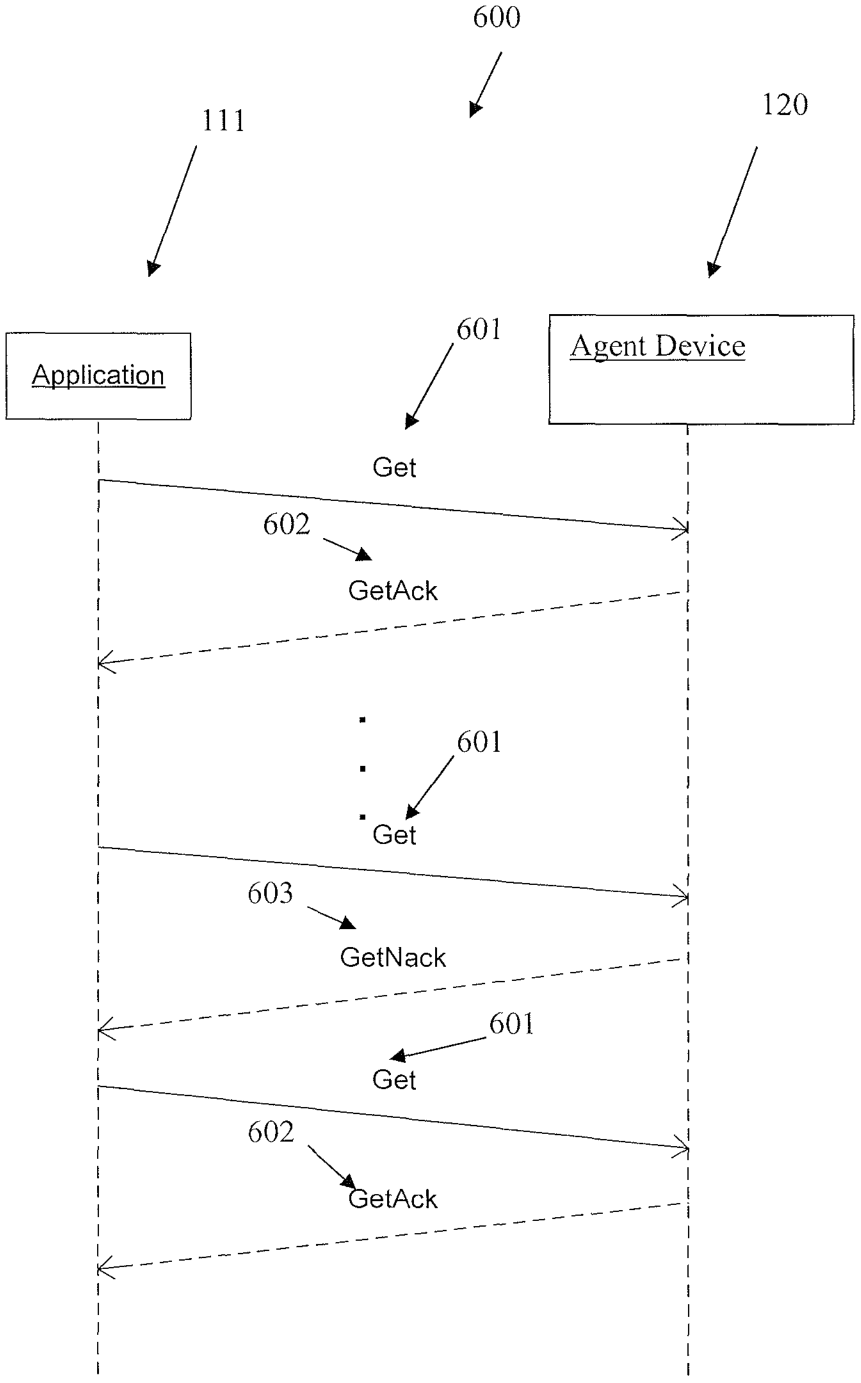
FIG. 6 illustrates a Get Command Frame Exchange Diagram.

FIG. 6 illustrates a get command frame exchange, shown generally by reference numeral 600. In this frame exchange diagram, the management station 110 through the application 111 obtain information from an agent device 120 utilizing the get command type 0x0C in the operation code field 238. In this way, the management station 110 can retrieve information from any agent device 120 which has been discovered and registered at the management station 110. The get message 601 is sent from the application 111 to the agent device 120 connected to the network 102. The get acknowledge message 602 is then returned. If a get negative acknowledge message 603 is returned, the get message 601 was not properly sent or received and the management station 110 will resend the get message 601. In one embodiment, the get message 601 may be used as the registration messages 3, 13.

Figure 7:
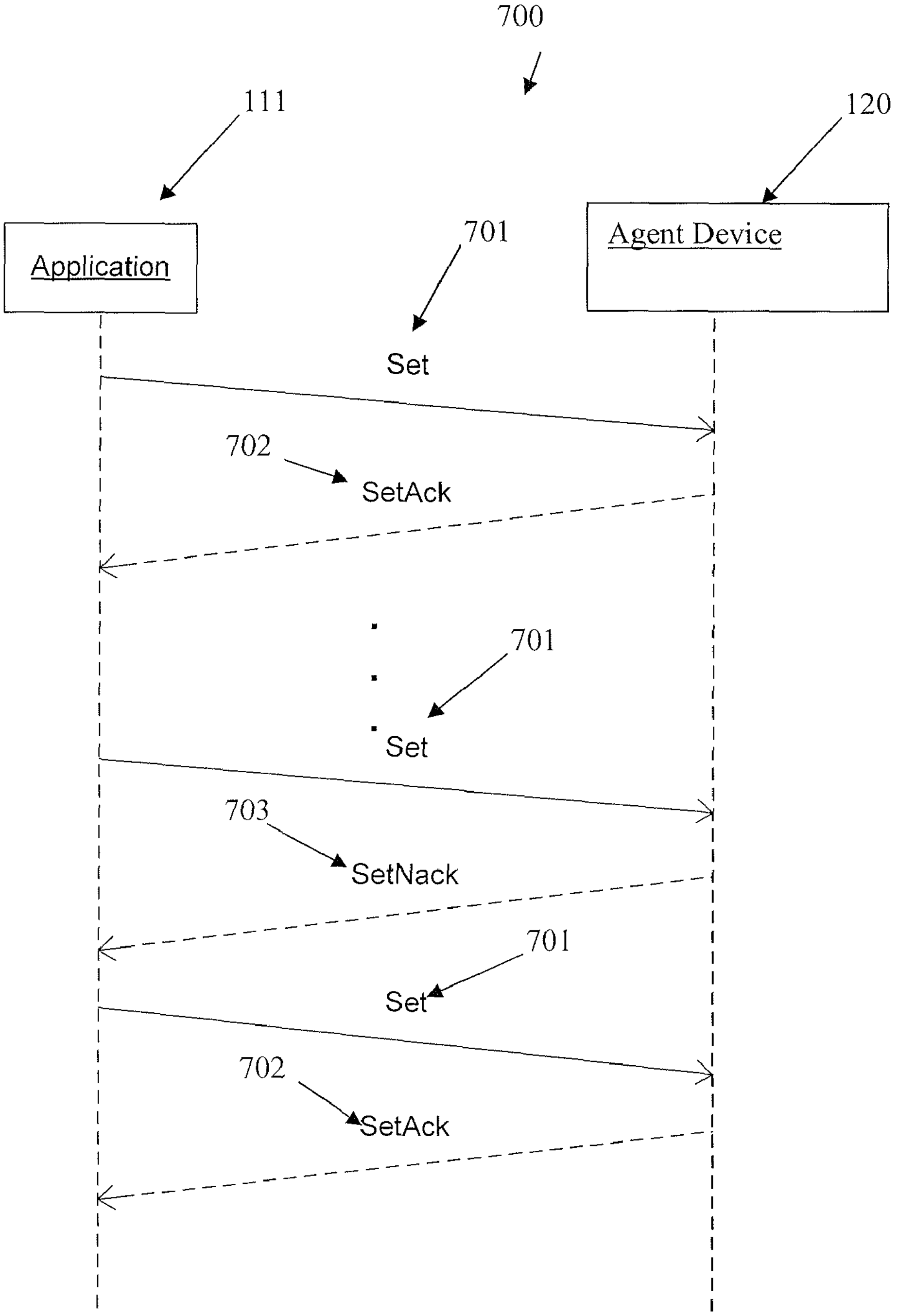
FIG. 7 illustrates a Set Command Frame Exchange Diagram.

FIG. 7 illustrates a set command frame exchange, shown generally by reference numeral 700. The set command type 701 will have a command type 0x0F in the operation code field 238 and is used by the management station 110 through the application 111 to change information at an agent device 120. In response to a set command 701, the agent device 120 will send a set acknowledge 702 having a command type 0x10 if the information has been correctly changed. If the information has not been correctly changed, the agent device 120 will send a set negative acknowledge message 703 having a command type 0x11 and the application 111 will resend the set message 701 until a set acknowledged message 702 is received. It is understood that the set negative acknowledge message 703 will be returned by the agent device 120 if the data portion of the set message 702 has an error and not if the protocol header 230 has an error.

Figure 8:
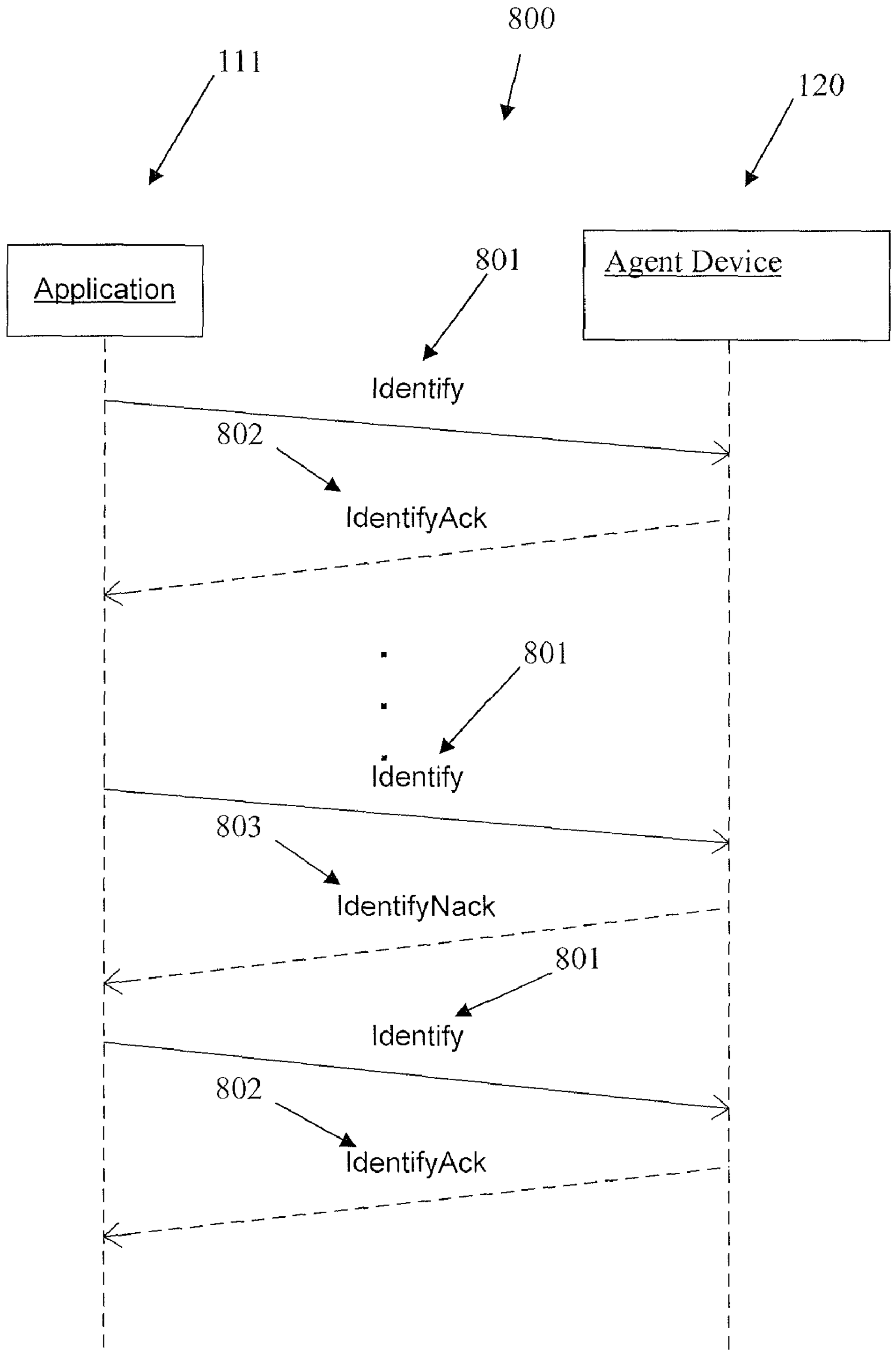
FIG. 8 illustrates an Identify Command Frame Exchange Diagram.

FIG. 8 illustrates an identify command frame exchange diagram, shown generally by reference number 800. By way of the identify message 801, the management station 110 through the application 111 can command an agent device 120 to identify itself. Management station 110 will send the identify frame 801 with the command type 0x06 in the operation code field 238 to the agent device 120 with a timeout period in the data portion 240 of the frame 220. The agent 120 will respond with an identify acknowledge message 802 with command type 0x07. If the device 120 that the agent 121 is running on does not have the ability to provide a visual feedback, the agent device 120 will respond with an identify negative acknowledgement frame of command type 0x08. The agent device 120 will set an internal timer, using the past timeout parameter to stop the identification process when the time is reached. If the management station 110 wishes to stop the visual identification process before the timeout expires, the management station 110 can send an identify message 801 with a timeout of zero. In either case, the agent device 120 will acknowledge the identify message 801 with the identify acknowledge message 802.

Figure 9:
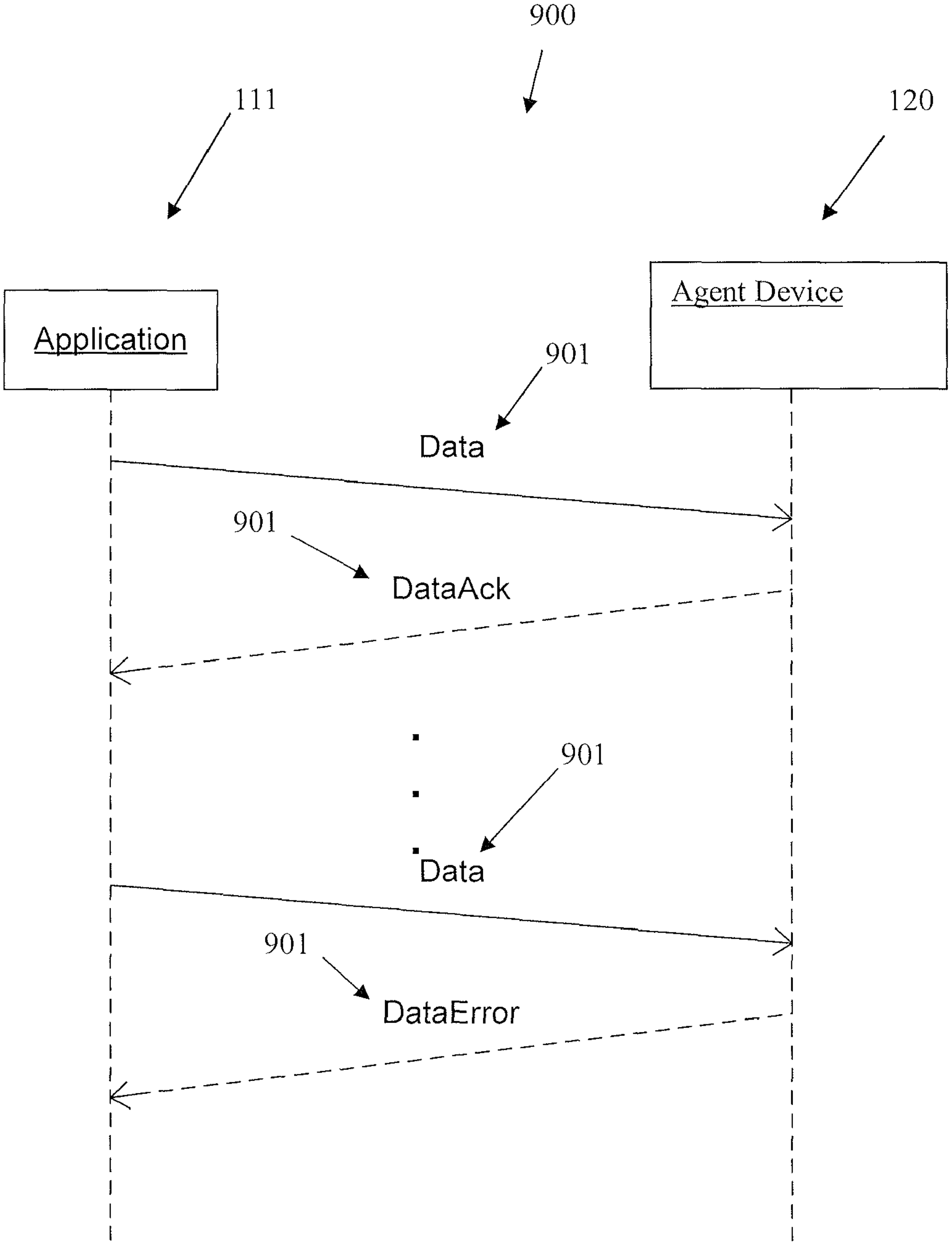
FIG. 9 illustrates a Data Command Frame Exchange Diagram.

FIG. 9 illustrates a data command frame exchange diagram, shown generally by reference numeral 900, by which the management station 110 through the application 111 can exchange data frames with an agent device 120. The management station 110 can send data frames with command type 0x00 in the operation code field 238 and receive data frames from the data agent 120 with command type 0x00 in the operation code field 238. This type of data frame 901 is provided to allow the management station 110 to exchange data using a higher layer of protocol, such as the Simple Network Management Protocol (SNMP) data 250 encapsulated in the Ethernet frame 210, as discussed above, to command the device agent 120 to send and receive data and the data responses using the same command type 0x00 in the data frame 901.

The discovery protocol header 220 encapsulated in the data 218 of the Ethernet frame 200 must be prearranged and agreed upon by the developers of the management station 110 and agent device 120 at the time of manufacture to permit this to operate prior to the agents 121 being fully configured. In this way, the system 100 permits a layer 2 transport to occur using the raw Ethernet protocol frame 200 even before the agent devices 120 have been fully configured. The discovery protocol data exchange rules must still be adhered to, but no restrictions are placed on the contents of the data transmitted through the data field 240 encapsulated in the Ethernet protocol frame 200.

Figure 10:
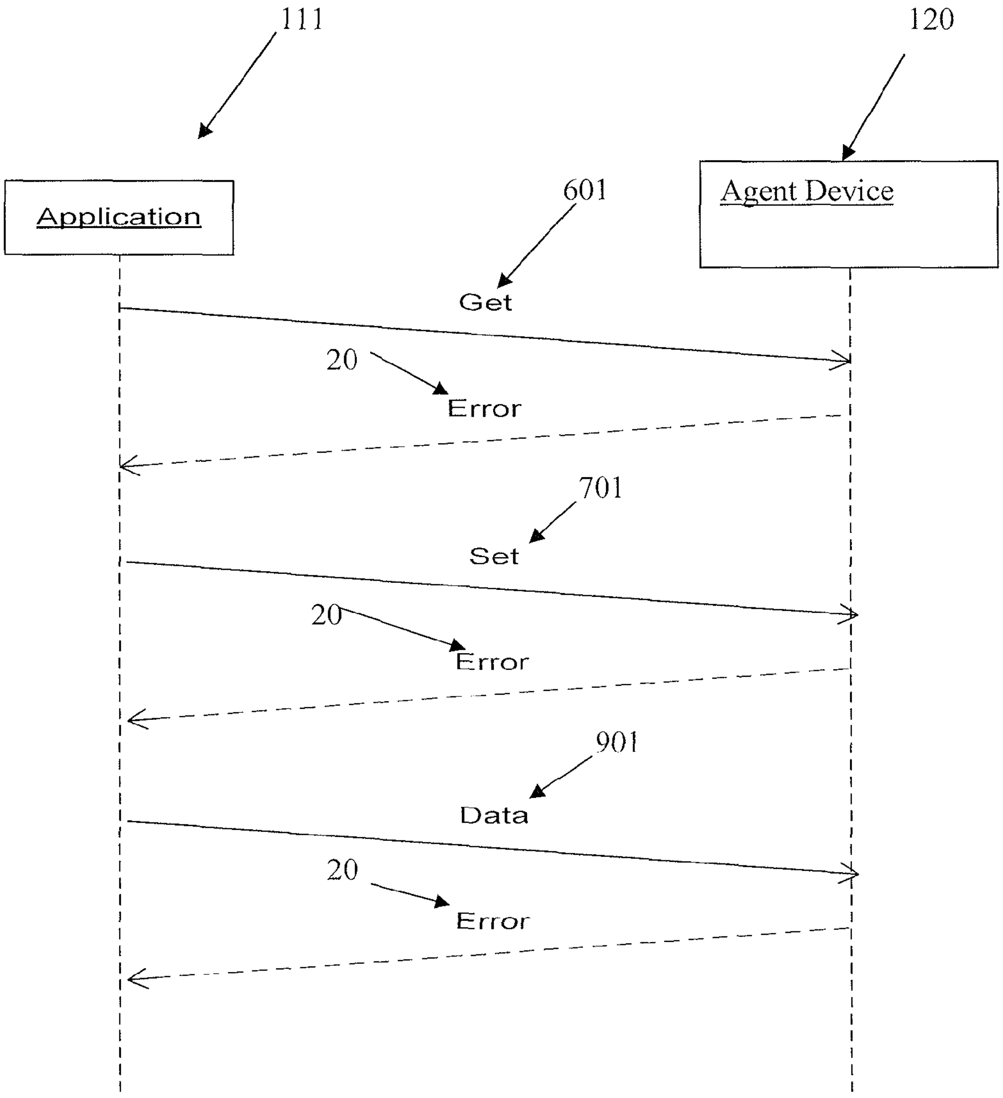
FIG. 10 illustrates an Error Handling Exchange Diagram.

FIG. 10 illustrates a manner in which the agent device 120 can notify the management station 110 of errors. As illustrated in FIG. 10, error messages 20 may be sent in response to an incorrect get message 601, set message 701 or data message 901. If the agent device 120 finds problems with the discovery protocol header 230 or the data portion 240 of the protocol frame 220 it will respond with an error frame 20 to the application 111. The error frame 20 will contain an error code indicating the error type and will have the command type 0x03 in the operation code field 238.

Figure 11:
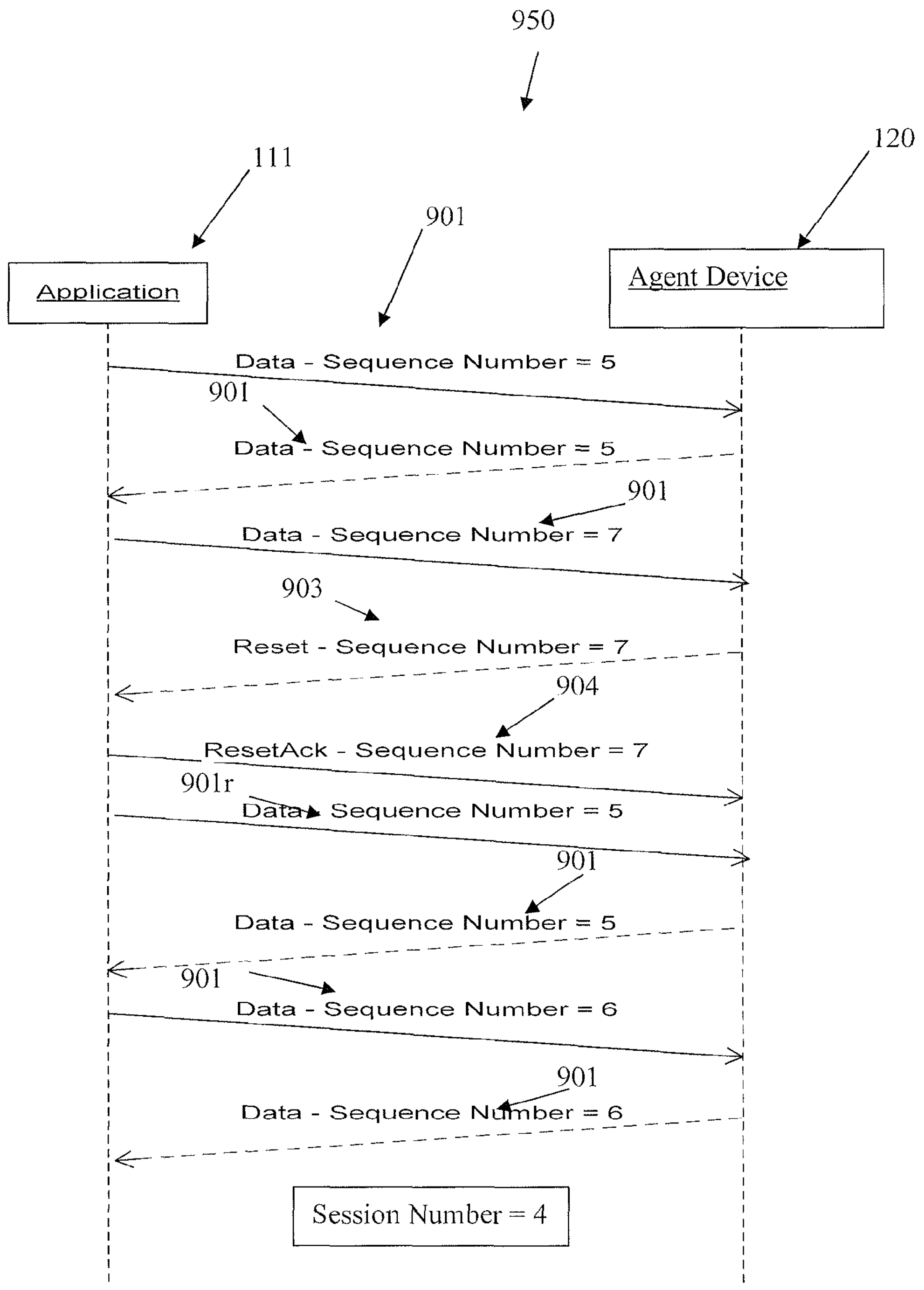
FIG. 11 illustrates Sequence Number Processing according to one embodiment of the present invention.

FIG. 11 illustrates a sequence number processing exchange diagram, shown generally by reference numeral 950. The session number for this example is "4". According to one embodiment, the discovery protocol requires sequence numbers 36 in sequence number field 236*q* of data frame 901 to be sequential. The sequence number processing exchange diagram 950 illustrates a data message 901 with a sequence number 36 having a value "5" and the data message 901 representing response and having the same sequence number value "5". However, the next data message 901 has a sequence number 36 with a value "7" which is the incorrect sequence number value given the previous data sequence number 901 having the value "5". Because of this, the agent device 120 will send a reset message 903 having a sequence number 36 with a value "7". The application 111 will then send reset acknowledge message 904 also having a sequence number 34 with a value "7" in the sequence number field 236*q*. The application 110 and agent device 120 will then rewind their respective sequence numbers 36 to the starting point for this session which is session number 34 plus one, e.g. value session number (4)+1=5. The application 111 will then send the immediate preceding data message which was reset by the agent device 120, in this case data message 901*r*, which is the same as data message 901 in FIG. 11, with the initial sequence number value "5" in the sequence number field 236. The agent device 120 can then send data message 901 representing the response with the same sequence number value "5" in the sequence field 236. The application 111 will then send the data message 901 with sequence field 236 having the value "6". Because this data message 901 is then consistent for the agent device 120, the agent device 120 will then send data message 901 representing the response and having the value "6" in the sequence field 236. In this way, the agent device 120 will avoid missing a packet of data. It is understood that the sequence number 34 in the sequence field 236 will be based on the original session number 34 of the discovery message 1 or rediscovery message 11 which commenced session 30. As indicated above, the reset operation code is OAT in the operation code field 238 of the reset message 903. The reset acknowledge operation code is 0xFE in the operation code field 238 of the reset acknowledgment message 904.

Accordingly, the above describes a system 100 and processes 300, 310, 320 and 330 by which a management station 110 sends a discovery message 1 and periodically sends rediscovery messages 11 which allows the management station 110 to reliably find all of the discovery aware agent devices 120 connected to the network 102, or added at a later time, and registers them using a registration agent 113 to place them under management of the management station 110. The discovery process 300 is initiated by the management station 110 when the management station 110 sends a multicast discovery message 1. The discovery protocol aware devices 120 recognize the discovery message's 1 unique protocol frame structure 220 and the decodes the required information, including the operation code 0x01 for the discovery message 1 or 0x04 for the rediscovery message 11 in the operation code field 238. The session number 34 in the session field 236*s* of the discovery frame 202 is retained by each of the agent devices 120 to be used as the base of the sequence number 36 to appear subsequently in the sequence field 236*q* of subsequent messages 201 including the registration message 3, 13. The session number 34 is also retained by the agent devices 120 to compare against the session number 34 contained in the session field 236*s* of subsequent rediscovery messages 11 to determine whether or not the session number 34 is different indicating that the agent device 120 should send a rediscovery acknowledge signal 12. At this time, the agent device 120 will retain the management station address 112 for further communication with the management station 110 that initiated the discovery session 30. Any unicast frames seen by the agent device 120 with a different management station address 112 will then be disregarded.

When a management station 110 receives a unicast discovery acknowledge message 2, the management station 110 examines all of the relevant fields for correctness before continuing. The examined fields are preferably the session number field 236*s*, which should contain the same value as that contained in the session number field 236*s* of the discovery message 1 sent by the management station 110, the operation code fields 238 which must be 0x02 identifying a discovery acknowledge message 2, and, the access control field 239 to verify the identity of the device 120 for security reasons.

If all of these fields are correct, the management station 110 will complete the session 30 establishment process with the discovery agent 120 that sent the discovery acknowledge message 2. Also, the management station 110 will retain the agent address 122 which is contained in the source MAC address field 212*s* of the Ethernet protocol frame 200 within which the discovery acknowledge message 2 was sent. The management station 110 will keep the session number 34 as a reference for any future rediscovery messages 11. The management station 110 will also create an internal variable for managing sequence numbers 36 which will start at the session number 34 plus the value one, or some other related combination, and be incremented by one, or any other predefined relationship, for every subsequent message exchange. The management station 110 will then complete the discovery process by sending a unicast registration message 3 to the specific agent device 120 which sent the discovery acknowledge message 2 using the agent address 122 contained in the source MAC address field 212*s* of the discovery acknowledge message 2.

The registration message 3 can be of any defined type, such as a get message 601, set message 701, identify message 801 or data message 901. However, in a preferred embodiment, the registration message 3 is a get message 601 or data message 901 requesting additional information from the agent device 120. The management station 110 will also record the agent address 122 at registration to facilitate future communication to the agent device 120.

When the agent device 120 receives the registration message 3, the agent device 120 will complete the session 30 establishment with management station 110 with management station address 112. The agent device 120 will also keep the session number 34 as a reference for any future discovery or rediscovery messages 1,11, seen by the agent device 120. The agent device 120 will also create an internal variable for managing sequence numbers 36 which will start at the session number 34 plus the value one, or some other related combination, and be incremented by one, or any other predefined relationship, for every subsequent message exchange.

The unicast discovery registration acknowledge frame 4 and the unicast rediscovery registration acknowledge message 14 are not mandatory to complete the discovery process. However, they do allow the management station 110 to be certain that the agent device 120 has indeed seen the registration frame 3, 13 to avoid any ambiguity.

It should also be noted that the registration message 3 and the registration acknowledge message 4 are not protocol frames in the sense that they have defined operation codes in the operation code field 238, but rather represent any supported unicast frame types permitted by the protocol.

It is also understood that the session number 34 may be created by the management station 110 and by any means, including random generation. The session number 34 will remain valid for the current session 30 with all of the managed agent devices 120 that have been registered. The session number 34 sent in the initial discovery message 1 is retransmitted in all rediscovery messages 11 so that the rediscovery messages 11 will only find devices 120 that have not correctly completed the discovery process for the same current session 30 having the session number 34 in the session field 236, and, a newly added agent device 120 to the network 102. If the management station 110 must start a new session 30, the management station 110 will send a new discovery message 1 with a session number 34 in the session number field 236 which is different from the previous session 34.

It is understood that while the invention has been described with reference to MAC addresses provided by the IEEE Registration Authority, the invention is not limited to use of MAC addresses specifically. Rather, the invention could operate with any address allocated to a network device at the time of manufacture which uniquely identifies the network device. Moreover, the invention could operate if several different unique addresses are allocated to a single network device at the time of manufacture each addressing uniquely identifying the network device. For example, the invention would operate if the network device had a unique address allocated by the manufacturer to uniquely identifying the network device as well as a MAC address allocated by the IEEE Standards Association to also uniquely identify the device.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A method for discovering agent devices connected to a network, said method comprising:

broadcasting, from a management station, a multicast discovery message to all agent devices connected to the network, the multicast discovery message comprising a station address uniquely identifying the management station, a session number identifying a session, and command instructions instructing all discovery aware agent devices connected to the network to answer the discovery message;

receiving, at the management station, discovery acknowledge unicast messages from at least some of the discovery aware agent devices connected to the network, the discovery acknowledge unicast messages comprising at least a device address uniquely identifying the discovery aware agent device sending the discovery acknowledge unicast message and the session number identifying the session;

sending, from the management station, a unicast registration message to each discovery aware agent device from which the management station received a corresponding discovery acknowledge unicast message using the device address provided in the corresponding discovery acknowledge unicast message, said unicast registration message comprising a sequence number based on the session number identifying the session.

2. The method of claim 1 further comprising:

after receiving the discovery acknowledge unicast message containing the device address uniquely identifying the discovery aware agent device sending the discovery acknowledge unicast message, registering, at the management station, the device address of the corresponding discovery aware agent device to permit further communication to the discovery aware agent device.

3. The method as defined in claim 1 further comprising:

periodically broadcasting, from the management station, rediscovery messages comprising the station address uniquely identifying the management station, the session number identifying the session and command instructions to all discovery agent devices connected to the network to answer the rediscovery message;

receiving, at the management station, rediscovery acknowledge unicast messages from any discovery aware agent devices connected to the network which did not receive a unicast registration message from the management station comprising the sequence number based on the session number identifying the session, said rediscovery acknowledge unicast message containing at least the device address uniquely identifying the discovery aware agent device sending the rediscovery acknowledge unicast message and the session number identifying the session;

sending, from the management station, a unicast registration message to each discovery aware agent device from which the management station received a corresponding rediscovery acknowledge unicast message using the device address provided in the corresponding rediscovery acknowledge unicast message, said unicast registration message comprising a sequence number based on the session number identifying the session;

wherein the discovery aware agent device receiving a unicast registration message will not respond to any multicast rediscovery messages having the session number identifying the session.

4. The method as defined in claim 1 further comprising:

broadcasting from the management station, the multicast discovery message to all agent devices connected to the network, the multicast discovery message comprising the station address uniquely identifying the management station, a new session number, different from the session number, said new session number identifying a new session, and command instructions to all discovery aware agent devices connect to the network to answer the multicast discovery message;

receiving, at the management station, discovery acknowledge unicast messages from at least some of the discovery aware agent devices connected to the network, the discovery acknowledge unicast messages containing at least the device address uniquely identifying the discovery aware agent device sending the discovery acknowledge unicast message and the new session number identifying the new session;

sending, from the management station, a unicast registration message to each discovery aware agent device from which the management station received a corresponding discovery acknowledge unicast message using the device address provided in the corresponding discovery acknowledge unicast message, said unicast registration message comprising a new sequence number based on the new session number identifying the new session;

wherein each discovery aware agent device receiving a unicast registration message in response to the discovery acknowledge unicast message having the new session number will not respond to any multicast rediscovery messages having the new session number identifying the new session; and after receiving the discovery acknowledge unicast message containing the device address uniquely identifying the discovery aware agent device sending the discovery acknowledge unicast message and the new session number identifying the new session, registering, at the management station, the device address of the corresponding discovery aware agent device to permit further communication to the discovery aware agent device.

5. The method as defined in claim 4 further comprising:

periodically broadcasting, from the management station, rediscovery messages comprising the station address uniquely identifying the management station, the new session number identifying the new session and command instructions to all discovery agent devices connected to the network to answer the rediscovery message;

receiving, at the management station, rediscovery acknowledge unicast messages from any discovery aware agent devices connected to the network which did not receive a unicast registration message from the management station comprising the new sequence number based on the new session number identifying the new session, said rediscovery acknowledge unicast message containing at least the device address uniquely identifying the discovery aware agent device sending the rediscovery acknowledge unicast message and the new session number identifying the new session;

sending, from the management station, a unicast registration message to each discovery aware agent device from which the management station received a corresponding rediscovery acknowledge unicast message using the device address provided in the corresponding rediscovery acknowledge unicast message, said unicast registration message comprising the new sequence number based on the new session number identifying the new session;

wherein the discovery aware agent device receiving a unicast registration message will not respond to any subsequent multicast rediscovery messages having the new session number identifying the new session.

6. The method as defined in claim 1, wherein the agent devices comprise Intelligent Electronic Devices having an Ethernet interface, the device address is a Media Access Control (MAC) address, and the station address is a Media Access Control (MAC) address uniquely identifying the management station.

7. The method as defined in claim 1 wherein the unicast registration message is selected from the group consisting of get messages, set messages, data messages and identify messages.

8. The method as defined in claim 1 wherein the discovery messages, rediscovery messages and registration messages from the management station to the agent devices comprise an Ethernet protocol frame in an Ethernet protocol, said Ethernet protocol frame having a data link header comprising the station address of the management station, and, an Ethernet data portion; and wherein the Ethernet data portion comprises data for the agent devices in a further protocol, different from the Ethernet protocol.

9. The method as defined in claim 1 wherein the discovery messages, rediscovery messages and registration messages from the management station to the agent devices comprise an Ethernet protocol frame in an Ethernet protocol, said Ethernet protocol frame having a data link header comprising the station address of the management station and an Ethernet data portion; and wherein the Ethernet data portion comprises data in a first protocol frame in a first protocol, different from the Ethernet protocol, said first protocol frame having a first protocol header and a first protocol data portion, said first protocol data portion comprising a second protocol frame in a second protocol, said second protocol differing from the Ethernet protocol, said second protocol frame comprising a second protocol header and a second protocol data portion.

10. The method as defined in claim 9 wherein the second protocol is Simple Network Management Protocol (SNMP).

11. A system that facilitates discovery of agent devices connected to a network, said system comprising:

at least two discovery aware agent devices connected to the network, each discovery aware agent device configured to receive multicast discovery messages and unicast registration signals from the network and to send to the network discovery acknowledge unicast messages comprising a device address uniquely identifying the discovery aware agent device that sent the unicast discovery acknowledge message;

a management station connected to the network and configured to send unicast registration messages, multicast discovery messages and multicast rediscovery messages, said multicast discovery messages and multicast rediscovery messages comprising a station address uniquely identifying the management station and a session number uniquely identifying a session;

wherein the management station is also configured to broadcast the multicast discovery message on the network and to receive in response discovery acknowledge unicast messages comprising at least the device address uniquely identifying the discovery aware agent device sending the discovery acknowledge unicast message and the session number uniquely identifying the session; and wherein the management station is also configured to send the unicast registration message to each discovery aware agent device from which the management station received a corresponding discovery acknowledge unicast message using the device address provided in the corresponding discovery acknowledge unicast message, said registration message comprising a sequence number based on the session number uniquely identifying the session.

12. The system as defined in claim 11 wherein the management station periodically broadcasts the multicast rediscovery messages comprising the station address uniquely identifying the management station and the session number uniquely identifying the session, and, receives in response rediscovery acknowledge unicast messages from any of the at least two discovery aware agent devices connected to the network which did not previously receive a unicast registration message from the management station, the rediscovery acknowledge unicast messages containing at least the device address uniquely identifying the discovery aware agent device sending the rediscovery acknowledge unicast message, and the session number uniquely identifying the session; and wherein the management station sends the unicast registration message to each discovery aware agent device from which the management station received a corresponding rediscovery acknowledge unicast message using the agent address provided in the corresponding rediscovery acknowledge unicast message, said registration message comprising a sequence number based on this session number uniquely identifying the session.

13. The system as defined in claim 12 further comprising:

a registration agent associated with the management station for registering the agent address of each discovery aware agent device from which the management station receives the corresponding discovery unicast message or the corresponding rediscovery acknowledge unicast message to permit further communication to the discovery aware agent device.

14. The system as defined in claim 12 wherein the discovery aware agent devices receiving a unicast registration message will not respond to any multicast rediscovery messages having the session number uniquely identifying the session.

15. The system as defined in claim 11, wherein the discovery aware agent devices comprise Intelligent Electronic Devices having an Ethernet interface, the device address is a Media Access Control (MAC) address, and the station address is a Media Access Control (MAC) address uniquely identifying the management station.

16. The system as defined in claim 11 wherein the unicast registration message is selected from the group consisting of get messages, set messages, data messages and identify messages.

17. The system as defined in claim 11 wherein the discovery messages, rediscovery messages and registration messages from the management station to the agent devices comprise an Ethernet protocol frame in an Ethernet protocol, said Ethernet protocol frame having a data link header comprising the station address of the management station, and, an Ethernet data portion; and wherein the Ethernet data portion comprises data for the agent devices in a further protocol, different from the Ethernet protocol.

18. The system as defined in claim 11 wherein the discovery messages, rediscovery messages and registration messages from the management station to the agent devices comprise an Ethernet protocol frame in an Ethernet protocol, said Ethernet protocol frame having a data link header comprising the station address of the management station and an Ethernet data portion; and wherein the Ethernet data portion comprises data in a first protocol frame in a first protocol, different from the Ethernet protocol, said first protocol frame having a first protocol header and a first protocol data portion, said first protocol data portion comprising a second protocol frame in a second protocol, said second protocol differing from the Ethernet protocol, said second protocol frame comprising a second protocol header and a second protocol data portion.

19. The system as defined in claim 18 wherein the second protocol is Simple Network Management Protocol (SNMP).

20. The system as defined in claim 19 wherein the unicast registration message is selected from the group consisting of get messages, set messages, data messages and identify messages.

21. An article of manufacture comprising:

a non-transitory computer readable medium having stored thereon computer readable code executable by one or more processors of a management station performing the following:

at the commencement of a session, broadcasting, from the management station, a multicast discovery message to all agent devices connected to the network, the multicast discovery message comprising a station address uniquely identifying the management station, a session number identifying the session, and command instructions instructing all discovery aware agent devices connected to the network to answer the discovery message;

receiving, at the management station, discovery acknowledge unicast messages from at least some of the discovery aware agent devices connected to the network, the discovery acknowledge unicast messages comprising at least a device address uniquely identifying the discovery aware agent device sending the discovery acknowledge unicast message and the session number identifying the session; and sending, from the management station, a unicast registration message to each discovery aware agent device from which the management station received a corresponding discovery acknowledge unicast message using the device address provided in the corresponding discovery acknowledge unicast message, said unicast registration message comprising a sequence number based on the session number identifying the session.

* * * * *